(12) United States Patent
Alber

(10) Patent No.: US 6,617,545 B1
(45) Date of Patent: Sep. 9, 2003

(54) METHOD AND DEVICE FOR MACHINING COMPONENTS

(75) Inventor: Gerhard Alber, Ravensburg (DE)

(73) Assignee: Thyssenkrupp Technologies AG (DE)

( * ) Notice: Subject to any disclaimer, the term of this patent is extended or adjusted under 35 U.S.C. 154(b) by 0 days.

(21) Appl. No.: 10/088,422

(22) PCT Filed: Oct. 17, 2000

(86) PCT No.: PCT/EP00/10207

§ 371 (c)(1),
(2), (4) Date: Mar. 14, 2002

(87) PCT Pub. No.: WO01/28735

PCT Pub. Date: Apr. 26, 2001

(30) Foreign Application Priority Data

Oct. 18, 1999 (DE) .......................................... 199 50 079

(51) Int. Cl.[7] ............................................. B23K 37/047
(52) U.S. Cl. ................................................. 219/121.82
(58) Field of Search ....................... 219/121.82, 121.67, 219/121.68, 121.69, 121.7, 121.71, 121.72; 269/8, 276

(56) References Cited

U.S. PATENT DOCUMENTS 4,674,949 A    6/1987   Kroczynski
5,270,678 A *  12/1993  Gambut et al. ............. 335/289
5,774,976 A *   7/1998  Stark .......................... 29/732
6,486,436 B1 * 11/2002  Shah et al. ............ 219/121.82

FOREIGN PATENT DOCUMENTS

FR          2 769 531        4/1999

* cited by examiner

Primary Examiner—Tom Dunn
Assistant Examiner—Jonathan Johnson
(74) Attorney, Agent, or Firm—McGlew and Tuttle, P.C.

(57) ABSTRACT

A method for machining components (8) which do not contain magnetic material is provided. The method comprises placing the component (8) on at least one clamping magnet arranged on a machining table, whereby at least one clamping element (52) in a magnetic material is arranged on that side of the component (8) which faces the clamping magnet. The clamping element (52) is activated by and cooperates with the clamping magnet to fix the component (8) in its position. The technical problem of improving the effectiveness of the material throughput of the method and reducing the space requirements of the device for carrying out the method is solved by having the clamping element match the form of the component (8). The invention further relates to a device for carrying out the method.

19 Claims, 21 Drawing Sheets

METHOD AND DEVICE FOR MACHINING COMPONENTS

FIELD OF THE INVENTION

The invention relates to a method and a device for machining of components particularly applied in the production of metal plates, preferably on laser welding of various metal platelike components.

BACKGROUND OF THE INVENTION

The invention mainly relates to a method for machining of at least one component consisting of a nonmagnetic material, in which the component is positioned on at least one clamping magnet arranged on a machining table. At least one clamping element consisting of a magnetic material is arranged on the component side averting the clamping magnet. Subsequently the clamping elements are activated, thus fixing the component by the aid of the clamping magnet in its position on the machining table. A device accordingly designed and built also belongs to the field of this invention.

In the method described herein above, it is known from prior art to connect the clamping element, for example in the form of a magnetizable steel plate, vertically adjustable with the machining table. If a nonmagnetic component to be machined is laid onto the component support of the machining table, the clamping element is moved down and pressed by means of activating the clamping magnets against the component to be machined. Subsequently a machining of the component fixed in this manner is possible. After machining, the clamping element is raised again so that the machined component can be passed on for further machining or transport. Here too, the configuration of a vertically adjustable clamping element calls for quite substantial space. The movable arrangement of the clamping element moreover burdens the design expenditure in the field of the machining table so that the space available in the area of the machining table is narrowed for other applications and machining possibilities.

Moreover, the invention relates to a method in which a first machining table is arranged in a charging position, and a second machining table in a machining position within the working area of a machining device. At least one component is positioned and fixed in a first step on the first machining table, whereupon the first machining table is shifted to the machining position and the second machining table to the charging position, using adjustment means for this purpose. At least one component is machined by the machining device and then taken away by the first machining table. At the same time, at least one component is arranged and fixed on the second machining table. Subsequently, both machining tables are so adjusted that they change their positions, i.e. the first machining table is positioned again into the charging position and the second machining table into the machining position. An appropriately configured device to execute this method is known.

Known from prior art as per DE 195 26 466 C1 is such a method and an appropriate device for cutting and/or welding of metal plates. In the known method, a multitude of machining tables are used which are transported in revolving a mode, running through a multitude of positions as described in the following. In a first position, a first component is positioned and fixed on the machining table. In a second position lying at a certain distance, a second component is so arranged on the machining table that it rests flush to the first component. In a third position, the two components are connected to each other by the aid of a machining device, sliding the machining table through the machining area of the machining device. In a fourth position, the finished component is taken-off from the machining table. Subsequently, the machining table is transported back to the first position, its home position. Though this method allows for a clearly defined flow of material from the first to the fourth position of the machining table, it calls for a very large space, particularly demanded by the transportation facility for transport of the machining tables.

In FIGS. 22 to 24 of the attached drawing, other methods and devices known by prior art are shown which particularly illustrate the flow of material as well as the great demand for space required in each case. FIG. 22 shows a machining table BT on which the two pre-blanks VP1 and VP2 are positioned in Step I. In Step II the machining table BT is shifted to a working area (shown in dotted lines) of a machining device BE with a field portal FP so that the two pre-blanks VP1 and VP2 can be welded to each other. In Step IV, the machining table BT is reset back to its home position and the finished product FP is taken-off in Step IV. Apart from a flow of material that crosses and/or runs opposite to itself, this configuration bears the disadvantage of a slow cycle time. For before it is possible to arrange new pre-blanks VP1 and VP2 on the machining table BT, it is first required to take-off the finished product FP.

FIG. 23 shows the course of another procedure which employs a second machining table BT2 in addition to the aforementioned method. In Step I, the pre-blanks VP1 and VP2 are positioned and fixed on the machining table BT1 arranged in the charging position, subsequently shifting the machining table BT1 in Step II into the working area of the machining device BE. Then, in Step IV, the machining table BT1 is reset back into its home position in which the finished product FP is taken-off in Step IV. In parallel thereto, but staggered in time, the same procedure runs with machining table BT2. Thus, the machining device can work more effectively, because two pre-blanks VP1 and VP2 can be processed to one finished product FP consecutively and almost without any time delay. But the disadvantages here too, are the great demand for space which is particularly needed by the much bigger configuration of the machining device. Other disadvantages result from the non-linear flow of material as well as due to the circumstance that the pre-blanks are laid-in and the finished blanks taken-off at different positions.

FIG. 24, conversely, shows an arrangement composed of four machining tables BT1 to BT4 which are arranged on a circular machining platform. In a first position, the two pre-blanks VP1 and VP2 are positioned on the machining table BT1 in Step I. In Step II, the platform is turned by 90° so that the machining table BT1 is arranged in the working area of a machining device BE1. The machining of the two pre-blanks VP1 and VP2 takes place there.

By another rotation of the machining platform by 90°, another machining device BE2 is reached which allows for any further machining of the just welded pre-products. By another turn in Step IV, the machining table gets into the take-off position in which the finished product is taken-off in Step V. By another rotation by 90° in Step VI, the machining table gets back into its home position and can be provided with another two pre-blanks VP1 and VP2.

From the illustrated working mode, the relevant device evidences a substantial space demand, because the machining platform, in particular, must have a suitable diameter in order to be able to machine pre-blanks of a usual size with dimensions in a range from 1 to 5 m.

Moreover, this invention also relates to a method for the provision of components in which a first pile of components is arranged in a first take-up area and a second pile of components in a second take-up area. With a reclaimer device, the components are then reclaimed either from the first pile or from the second pile. A device suitable for the execution of this method also belongs to the field of this invention.

FIGS. 25 and 26 of the attached drawing show two devices for the provision of components for the execution of the generic method. FIG. 25 shows two take-up areas identified as security areas SB1 and SB2 where pallets PA1 and PA2 can be positioned, for example by the aid of fork-lift trucks. Arranged on pallets PA1 and PA2 each are piles of equal pre-blanks VP. In the first Step I, the pallet PA1 is shifted into the take-off area shown in dotted lines. From there, the pre-blanks VP are reclaimed from the pile in Step H and consecutively passed-on to the machining device BE until the pile will have been reclaimed entirely. In Step IV, the pallet PA1 is reset back into its home position, and in Step IV, the second pallet PA2 is shifted into the take-off area shown in dotted lines. Then, in Step V, the pre-blanks VP from pallet PA2 are fed to the machining device until here, too, the whole pile of pre-blanks VP will have been worked-off. Subsequently, in Step VI, the pallet PA2 is reset back into its home position. At the same time, a new pallet PA1 has been introduced into the security area SB1 as supply NS1 which can then be processed for a further procedure at the start of a new cycle with Step I. Accordingly staggered in time, the supply NS2 for pallets PA2 is realized in security area SB2. Hereof, it results that apart from the demanded large space and apart from the relevant expenditure on fencing of two security areas SB1 and SB2, there is the disadvantage that the cycle rate during the pallet exchange is substantially delayed. In the device for provision of components as shown in FIG. 26, therefore, the two pallets PA1 and PA2 are fed to two different take-off areas shown in dotted lines. Besides, the course of the various process steps I to VI is configured appropriately as described in connection with FIG. 25. Though a constant cycle rate is thus ensured throughout for the feed of pre-blanks to a machining device, the demand for space and the expenditure on providing security areas is much higher versus the device shown in FIG. 25.

SUMMARY AND OBJECTS OF THE INVENTION

Hence, the technical problem to be solved by this invention is to reduce the disadvantages known from the prior art, particularly relative to the effectiveness of the flow of material in these processes and relative to the space demanded by the devices required for these processes.

According to this invention, the aforementioned technical problem is solved by a method for machining of at least one component consisting of a non-magnetic material, in which the component is positioned on at least one clamping magnet arranged on a machining table, in which at least one clamping element consisting of a magnetic material is arranged on the component side averted from the clamping magnet and in which the clamping magnets are activated and wherein the component is fixed in its position, with the clamping element being adapted to the shape of the component.

Thus, it is possible in a reliable manner, also for two-dimensional machining lines, no matter whether for connection of two components or for cutting-apart of one component, to fix at least one component in such a way that a secure fixing of the non-magnetic component to both sides of the machining line is ensured. Therefore, it allows for a flexible machining of different components which have bent or cornered machining lines.

For a connection of two components, these are positioned and fixed on the machining table. The clamping elements allotted to the components and arranged on the non-magnetic component side averted from the clamping magnets, expose an area of a pre-defined width along at least one machining line which in this case represents the contact line of the two components. Thus, the end effector of the machining device can connect, preferably by welding the two components in this exposed area.

However, if it is intended to cut a component apart, then it is first positioned on and fixed at the machining table. At least two clamping elements which in their shape correspond to the two components obtained after the component has been cut apart are so positioned that they expose an area with a defined width along at least one machining line. Subsequently, the component is cut apart along this line. In these two cases described herein above, the clamping elements ensure that adjacent to the machining line at least one component is reliably pressed against the component support of the machining table. Thus it is prevented that the component and/or components change(s) its (their) position (s) during machining. As the clamping element is adapted to the shape of the component, it can also be designated as a component-specific clamping element.

In a preferred manner, after machining of at least one component, at least one clamping element is taken-off from the machining table. Subsequently at least one clamping element is positioned on at least one deposition table and the machined component and/or the machined non-magnetic components is (are) taken-off from the machining table. The clamping element deposited on the deposition table can then be taken-off for a new charging procedure and be positioned, together with at least one new non-magnetic component to be machined onto the machining table arranged in the charging position. Thus, a circulation of clamping elements is generated which are transported from the deposition table to the machining table arranged in a charging position in order to position and fix a non-magnetic component on the component support with clamping magnets. Then, the machining table is set to the machining position in which the machining of at least one component is carried-out. Subsequently, the clamping element is transported back to the deposition table. Thus, the two positions in which the machining table is charged on the one hand, and discharged again on the other hand can be provided for separately of each other.

Hence, the method proposed by this invention provides for a high flexibility in the machining of non-magnetic components. On the one hand, the shape of the clamping elements can be adapted to the shape of the components to be machined. On the other hand, the guidance of the clamping elements in circulation bears the advantage that a directive flow of material can be provided for, without this calling for a high constructive expenditure on stationary clamping elements which would be required for positioning and machining at one and the same position of a machining table. In a particularly preferred manner, therefore, the mobile circulation of clamping elements can be applied with one machining table, alternately taking a charging position as well as a machining and a take-off position. In particular, this is given with the method and the appropriate device for machining of components which is described hereinafter and which can be designated as a double-shifting table.

As a matter of fact, the described method, by use of clamping elements, can also be applied if only one part of the components to be machined is non-magnetic, while the other components are magnetic. This may be of particular advantage if magnetic and non-magnetic components are to be welded to each other.

The technical problem outlined herein above is also solved by a method for machining of components by arranging two machining tables at different planes one above the other and by linearly shifting the machining tables between the charging position and the machining position. Thus it is ensured that the machining tables must be arranged at two defined positions only. On the one hand, it is the charging position at which the at least one component to be machined is positioned and fixed on the machining table. On the other hand, it is the machining position in which a machining device machines at least one component. Therefore, the device can also be designated as a "double-shifting table". In fact, the aforementioned configuration has an autonomous character, independent from the inventive method described herein above.

After machining, the machined component(s) is (are) taken-off from the machining table. The charging position and the machining position are arranged at a linear distance to each other and the flow of material is clearly defined. For the components to be machined are fed to the charging position, the machining table transports the components to the machining position and proceeding from this machining position, the finished components are taken-off for another machining and/or for off-transportation. Thus, the components realize a flow of material in one direction, which reduces the space demand of the relevant machining device. But the space demand is also reduced in that the components serving for the feed of the components to be machined and/or for off-transportation of finished components can be arranged at a narrow space near the machining device. For example, it isn't required to realize both a charging and discharging at one position of the machining table.

The method described herein above and the relevant device can be employed on the one hand for connecting at least two components on the machining table. On the other hand, an application for cutting-apart of one component can be realized. The differences merely lie in how many components are positioned on the machining table and how many components have to be taken-off from the machining table in the machining position.

As the two machining tables are arranged as tables being movable above each other at different planes, it is a preferred manner to adapt the vertical position of an end effector of the machining device to the vertical position of the relevant machining table in the working area of the machining device. Thus the differences in height between the two machining tables are offset in a simple manner. Conversely, it is also possible, for example, to configure the lower table of the two machining tables as a vertically adjustable table so that it can be raised in the machining position by a defined distance. In that case, it will not be required to adapt the vertical position of the end effector.

Furthermore, it is a preferred way to provide a stopping frame by the aid of which the at least one component is shifted on the machining table. Here, too, it is preferred to adapt the vertical position of the stopping frame to the height position of the relevant machining table in the charging position.

Moreover, the at least one component is positioned by the aid of at least one jointing robot on the machining table.

Likewise, it is also feasible to execute the take-off of the finished component from the machining table in the machining position by the aid of a reclaimer robot. For both robots it is then preferred to adapt the vertical position of the grabbing element of the jointing robot and/or of the reclaimer robot to the vertical position of the machining table arranged in the charging position and/or machining position.

On the whole, it becomes evident that the arrangement of the two machining tables at different planes is not detrimental to the method, since a difference in height depending on the arrangement of the machining table in the upper or lower plane can be offset simply and effectively because of the automated manipulation and machining of at least one component.

The following advantages result from the aforementioned course of the procedure as well as from the relevant set-up of the device. One the one hand, it ensures a clear flow of material from one side of the machining device to the other side so that the components do not meet each other or cross their way during one machining cycle. Another advantage lies in the small number of machining tables. It is because to realize the course of the procedure according to this invention, only two machining tables are required which have to be adapted in their clamping technique to the outer configuration of at least one component to be machined in order to execute a series production. Finally, the small number of machining tables and the clear flow of material lead to little demand for space.

The technical problem outlined herein above is also solved by a device for grabbing of two separate objects with a grabbing device comprised of a grab arm, a suction frame affixed to the grab arm, and a multitude of suction elements connected to the suction frame in that a grabbing device for grabbing of the first object is affixed to the grab arm and that the suction elements extend through the openings arranged in the first object and grab the second object. In fact, the aforementioned configuration has an autonomous inventive character independent of the inventive method described herein above.

On account of the aforementioned configuration of the grabbing device, it is a preferred manner of operation to grab the first object at first in one work step and to transport it to the deposition place of the second object. There, the suction elements are moved up to the surface of the second object, for the purpose of which openings are arranged in the first object according to the positions of the suction elements. Subsequently, the grab arm can transport both objects to the common disposition place. There, it is possible to deposit both objects in such a manner that the first and the second object can be aligned to each other and be positioned centrally.

For this purpose, both the suction frame, the arrangement of the suction elements and the grabbing device are preferably configured component-specifically. If the first object is made of a magnetic material, the grab device may also be of a magnetically effective configuration, apart from a generally possible mechanical configuration. The second object, on the contrary, may be of any material, merely its surface shall allow for the adherence of suction elements.

In another preferred manner, the-first object is configured as a clamping element made of a magnetic material and the second object is provided as a component made of a non-magnetic material. Thereby, it is possible to use the device for the grabbing of two separate objects with an aforementioned device for machining of components consisting of a non-magnetic material. With this device, it is in particular possible to make use of the advantage that merely one grab arm preferably manipulated by an appropriate robot is needed in order to position both the clamping element and the component to be machined on a machining table. Since both objects, i.e., the clamping element and the component, are moreover deposited simultaneously, substantially less time is needed for this process than if the grab arm first transported the component, and then the clamping element to the machining table.

In accordance with another, in fact autonomous doctrine, the technical problem outlined herein above is solved by the application of the method being the subject of this invention with a procedure for the provision of components in that the first take-up area and the second take-up area for the piles of components are arranged at least partly, preferably completely one above each other. In this manner, the advantage realized is that no time delay occurs during the exchange of piles of components, but that at least one pile of components is made available to a reclaimer robot. However, since the two piles of robots are arranged one above the other, the ground area of a device needed to realize the procedure of providing components is the ground area required for making available only one pile of components. Thus, the space demand needed to realize constant availability of one pile of components is cut into half as compared with prior art technology.

A compact arrangement of several devices for the provision of components is thus made possible.

This advantage will take effect especially if the positioning and machining of components is also accomplished in a narrow space, particularly if the machining tables on which the components are to be arranged and positioned are arranged in merely one charging position to this effect. However, by way of the configuration of this method and the device being the subject of the invention, direct access of three devices or more for provision of components to the charging position of the machining table and/or machining tables is made possible.

Moreover, it is preferred that the components of a pile lying one above the other are singularized by the aid of a singularization device and that the singularization device is moved by the aid of a lifting device at least within two vertical sections that correspond with the take-up areas. Thus, the singularization device can be positioned where the allocated take-off device, for example a reclaimer robot, takes-off single components from the pile. By the aid of the lifting device, only one singularization device is required for both take-up areas. This reduces the space demand and cuts costs.

The advantage of low costs on the whole is also achieved by the inventive device for providing of components. As the spatial area which an automatic take-off device like a reclaimer robot can have access to must be extensively protected from access by human beings, the aforementioned cut in space demand by half as compared with prior art technology also leads to a reduction in the expenditure on security measures. This leads to the aforementioned advantage in production costs of the inventive device for the provision of components.

The aforementioned methods and devices are preferably applied for a two-dimensional machining of plane components. But it is emphasized that the methods and devices are not restricted to a machining of two-dimensional components; that they are also suitable for a three-dimensional machining of components. As outlined before, the methods and devices can be utilized for joining, particularly for welding by means of a laser welding equipment. Moreover, the methods and devices can also be applied for cutting-apart a component, as one may readily realize. Even though the invention is described in detail hereinafter by way of examples of a laser welding equipment, it is not restricted to this application.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
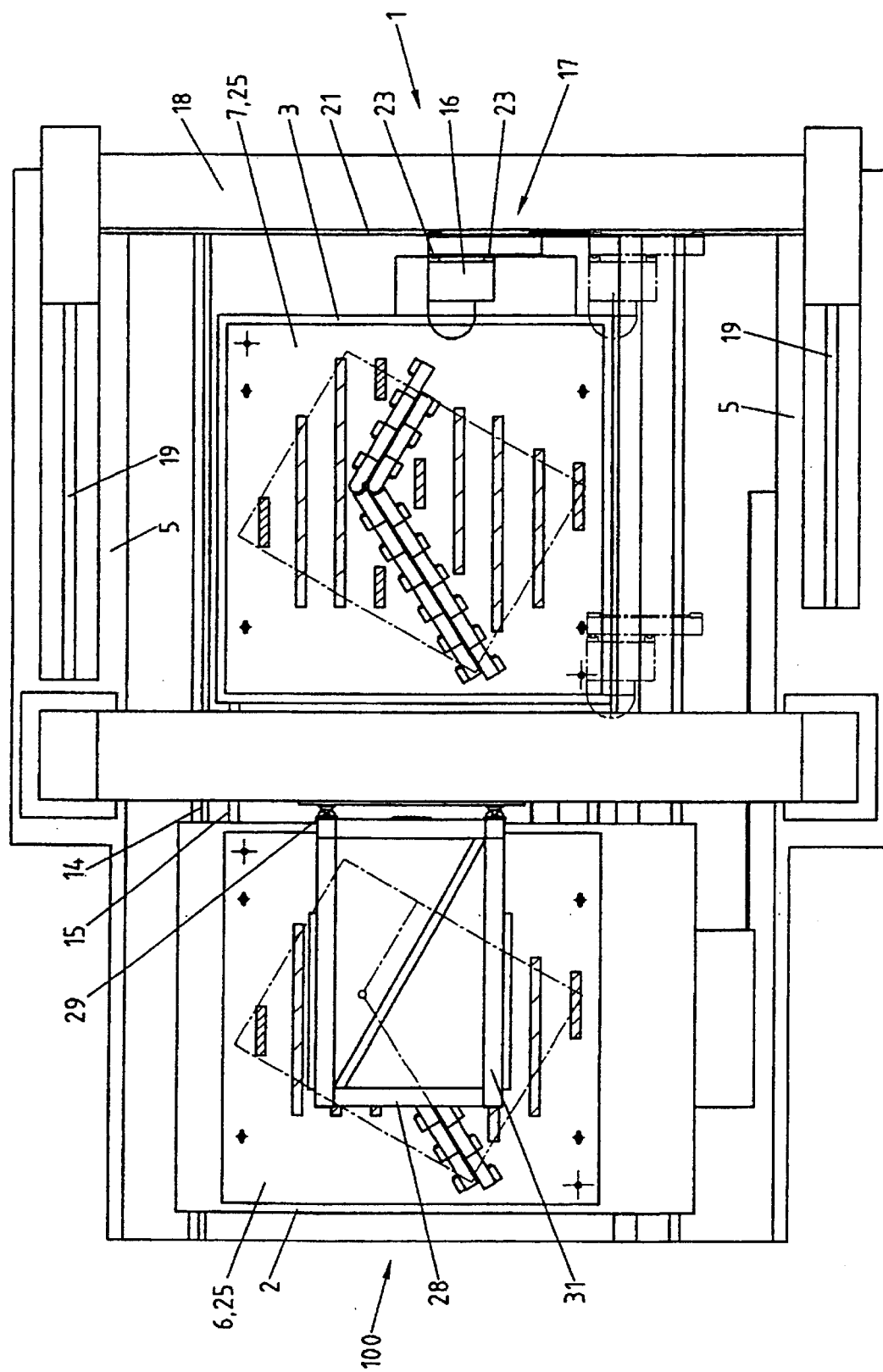
FIG. 1 is a top view showing a device for machining of components with two adjustable machining tables.
Figure 2:
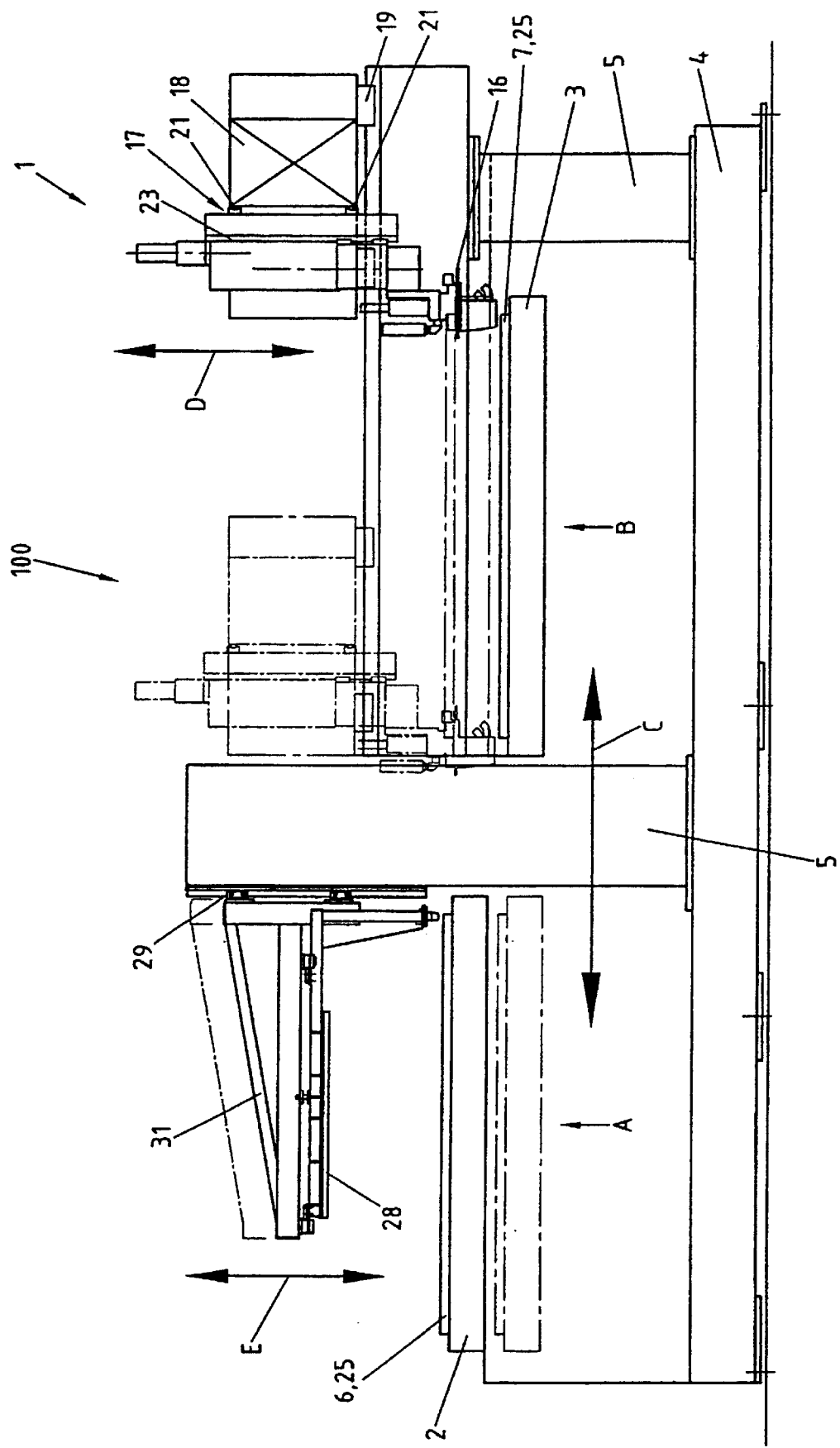
FIG. 2 a side view transversely to the adjustment device showing the device illustrated in FIG. 1.
Figure 3:
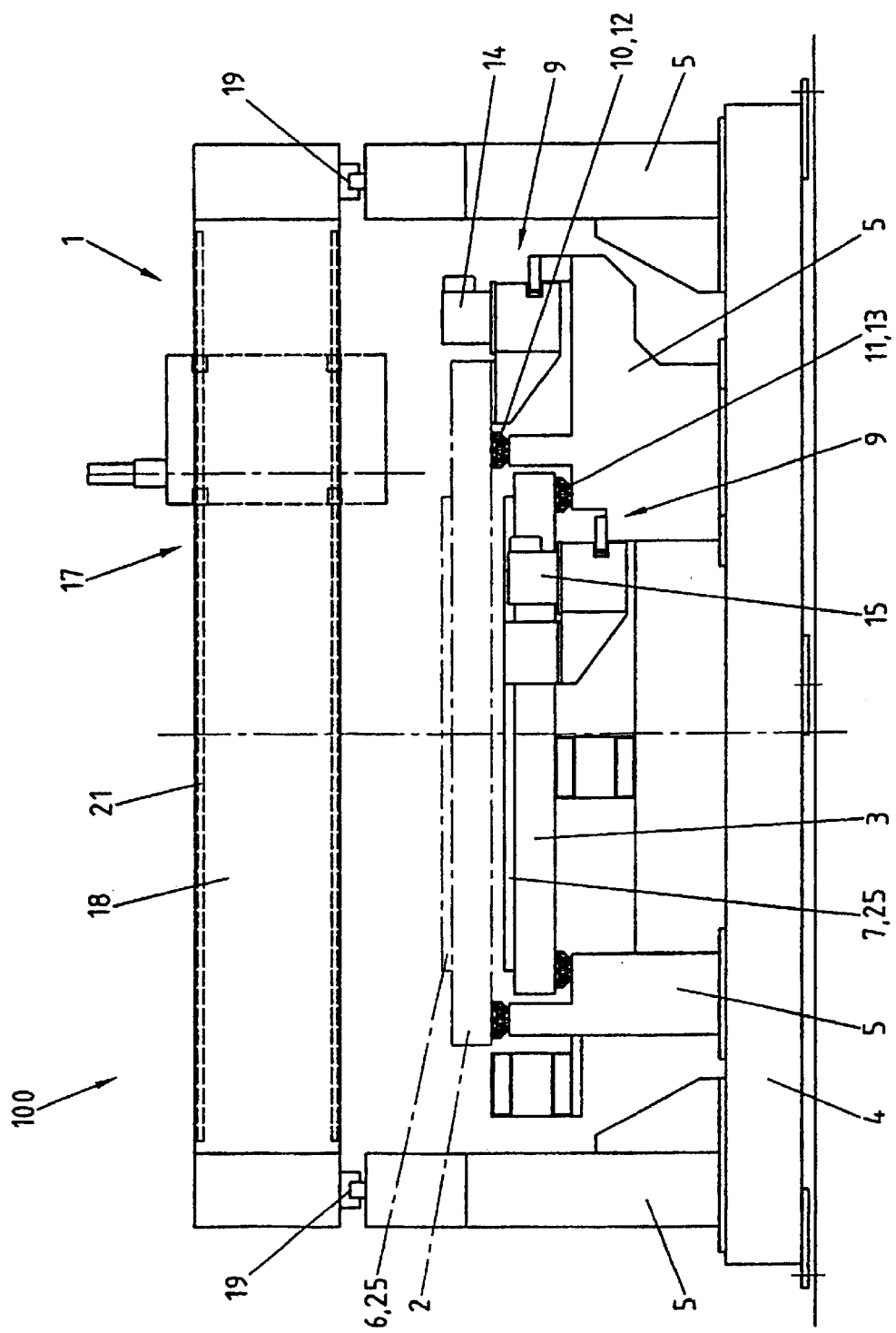
FIG. 3 is a view taken longitudinally to the adjustment device showing the device illustrated in FIGS. 1 and 2.

Referring to the drawings in particular, FIGS. 1 to 3 show a device for machining of components which is generally designated with 100, which has a machining device 1 and two machining tables 2 and 3. Furthermore, the device has a base frame 4 as well as a set-up frame to which the machining device 1 as well as the machining tables 2 and 3 are affixed in movable arrangement.

On the machining tables 2 and 3, fixing devices 6 and 7 each are arranged for fixing at least one component 8. Furthermore, adjustment means 9 are provided for, by the aid of which the machining tables 2 and 3 are shifted between a charging position A and a machining position B within the working area of the machining device 1.

As becomes evident, particularly from FIGS. 2 and 3, the machining tables 2 and 3 are arranged at different planes one above the other, the adjustment means 9 shifting the machining tables 2 and 3 in both directions between the charging position A and the machining position B, as illustrated by the double arrow in FIG. 2. The machining table 2 is adjustably arranged in an upper plane, while the machining table 3 is movably arranged underneath of the machining table 2. To allow for the adjustability of the machining tables 2 and 3, the adjustment means 9 are configured as linear guides 10 and/or 11 with the carriages 12 and/or 13 being engaged therewith. Furthermore, the adjustment means 9 have an upper linear drive 14 and a lower linear drive 15. Since it matters to achieve an exact positioning of the machining tables 2 and 3 both in the charging position A and in the machining position B, appropriate positioning means, for example limit switches and/or measuring instruments, are provided to determine the linear position of the machining tables 2 and 3 in a conventional manner. For the sake of clarity, these have been omitted in the embodiment shown in FIGS. 1 to 3.

The machining device 1 which in this case is configured as a laser welding equipment has an end effector 16 which is configured as a laser welding head as well as three-dimensional kinematics 17 to adjust the end effector 16 relative to the component 8 to be machined and/or relative to the machining tables 2 and 3. For this purpose, the machining device 1 is configured as a field portal 18, with it being possible to adjust the field portal 18 by the aid of linear guides and a linear drive along the set-up frame 5 in the adjustment direction C of the machining tables. Furthermore, the end effector 16 is affixed by way of a linear guide 21 as well as an allocated linear drive to portal 18 in order to be able to be adjusted transversely to the adjustment device C of the machining tables 2 and 3. In addition thereto, the end effector 16 can be shifted vertically in both directions, as illustrated by the arrow D in FIG. 2. For this purpose, in turn, a linear guide 23 as well as a linear drive are provided for. Due to the adjustability of the end effector 16 in vertical direction D, in particular, it is possible to machine components arranged on machining tables 2 and 3, said components being arranged at a different elevation depending on the relevant machining table 2 or 3. To this effect, it is merely required to consider the height difference between the two machining tables 2 and 3 when approaching the vertical position of the end effector 16.

As illustrated in FIG. 2, the device for machining of a component may take various positions. Marked by straight lines, the machining tables 2 and 3 are so illustrated that the machining table 2 is located in the charging position A, with the machining table 3 being located in the machining position B. Shown in dotted lines are the opposite positions which result after a linear shifting of both machining tables 2 and 3. Moreover, the end effector 16 is shown in an end position shifted in sliding direction C, with another position further ahead in sliding direction C shown in dotted lines.

Figure 5:
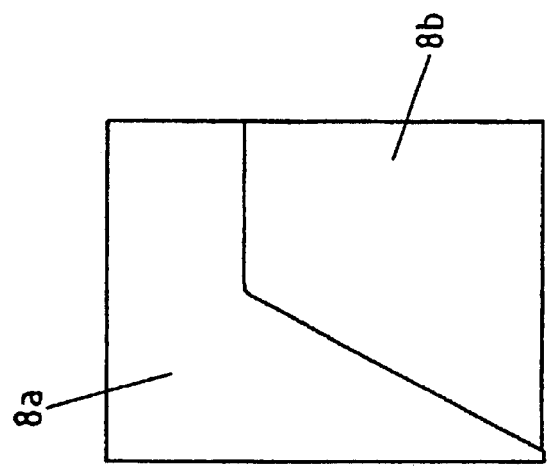
FIG. 5 is a view showing a geometrical configuration of the components to be processed in the machining device.
Figure 4:
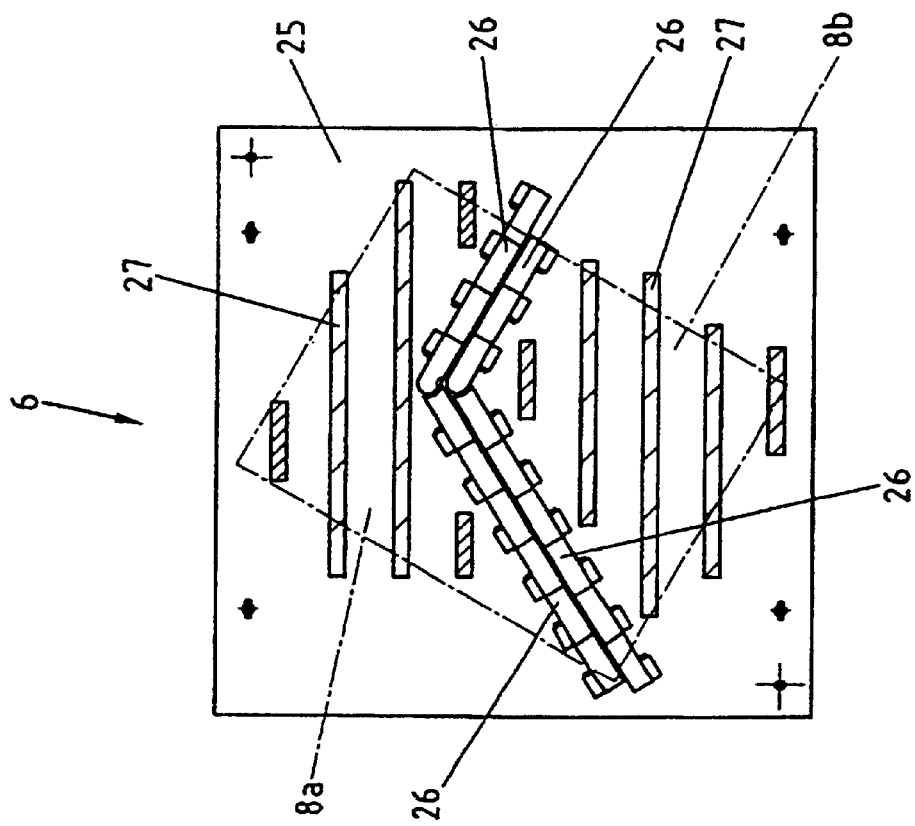
FIG. 4 is a view showing a component support for the components illustrated in FIG. 5.

FIG. 4 shows the fixing device 6 for fixing of at least one component 8. For this purpose, the fixing device is configured as component support 25 which is adapted to the shape of the components 8a and 8b shown in FIG. 5. On the component support 25, the fixing elements 26 configured as clamping magnets are arranged at both sides of the weld seam predetermined by the two components 8a and 8b. Furthermore, component support ledges 27 are allotted on the component support 25 in such a manner that the plane components 8a and 8b can be arranged in a defined position.

As is furthermore shown by FIGS. 1 and 2, a stop frame 28 to adjust the two components 8a and 8b is arranged vertically adjustable above position A. Fixed at the stop frame 28 is a component-specific T-square by which the component 8a and/or 8b can be aligned. For clarity's sake the T-square is not depicted in these figures. The stop frame 28 is fixed by means of a linear guide 29 and a linear drive via a rack 31 at the set-up frame 5.

To adjust components 8a and 8b, the stop frame 28 with the T-square is moved down in the direction of the still empty component support 25 of one of the machining tables 2 and 3, bringing the T-square in a position resting on the component support. Subsequently, the components 8a and 8b are inserted by means of a jointing robot described further below and brought in a position resting on the stop edge of the T-square. The stop frame 28 has sufficient distance to the component support 25 so that the jointing robot can laterally engage into the area underneath the stop frame and position the component 8a and 8b, respectively.

After positioning of the components 8a and 8b, the clamping magnets 26 are activated, thus fixing the components 8a and 8b in their position on the component support 25 which is predetermined by the stop frame 28. Subsequently, the stop frame 28 with the rack is again moved up as depicted by the double arrow E.

Figure 6:
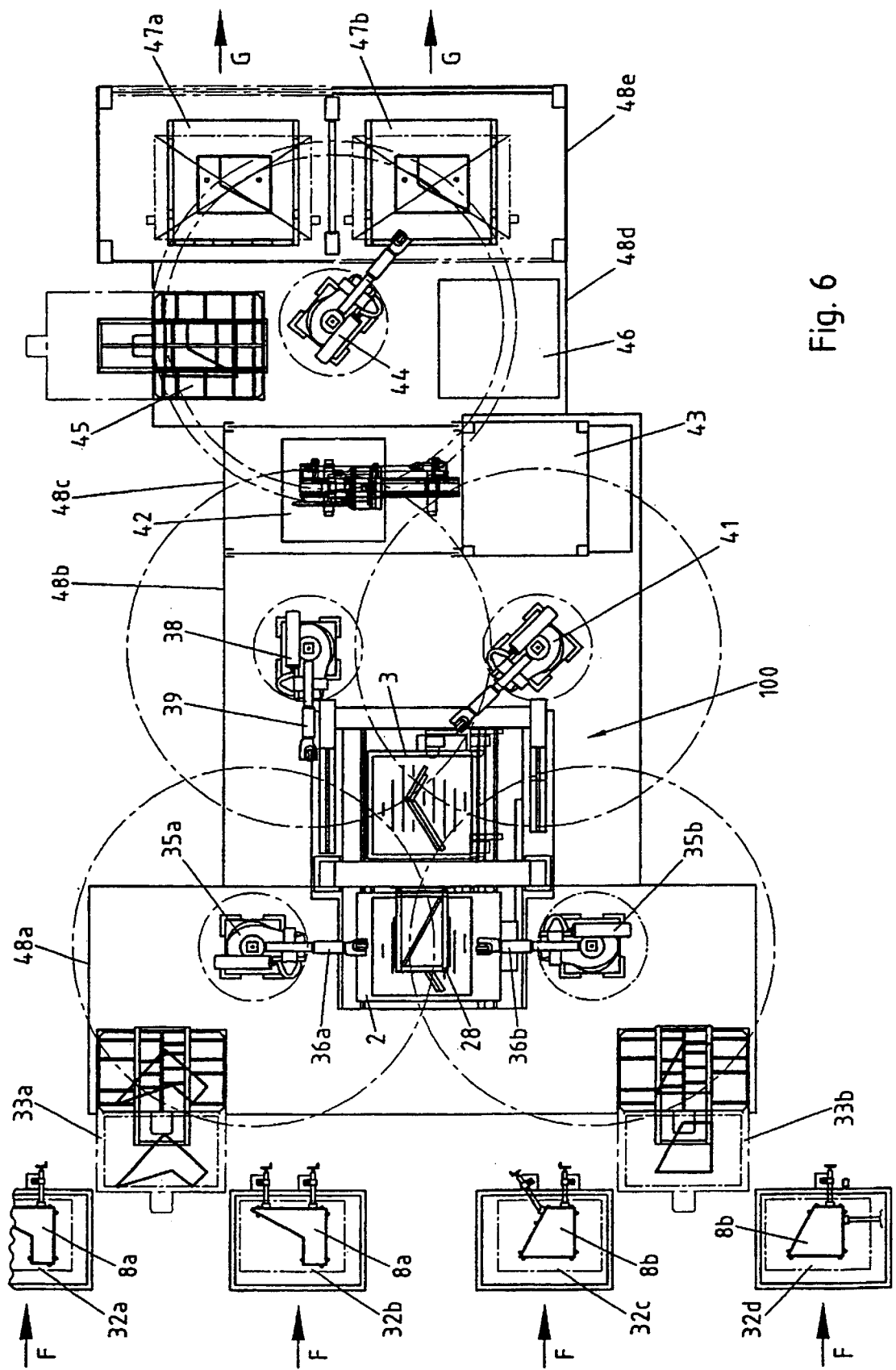
FIG. 6 is a top view showing a first embodiment of a laser welding equipment.
Figure 7:
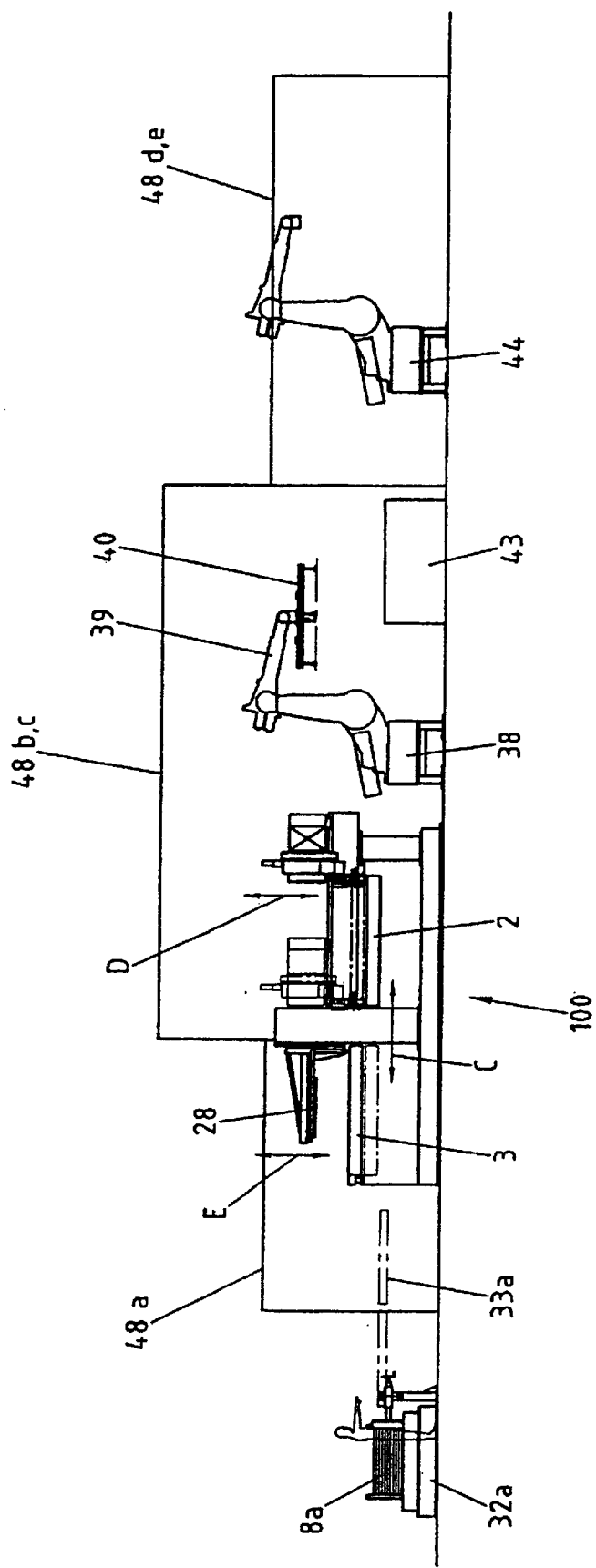
FIG. 7 is a side view showing the laser welding equipment illustrated in FIG. 6.

FIGS. 6 and 7 illustrate a first configuration of a laser welding equipment into which the aforementioned device 100 for machining of components as depicted in detail in FIGS. 1 to 3 is inserted. From the following description of the functional mode of the laser welding equipment, result the advantageous directed flow of material as well as other advantageous properties associated with the use of the device 100 which can also be designated as a double-shifting table.

With this laser welding equipment, piles of components 8a and 8b are arranged in pairs on pallets 32a, 32b, 32c, and 32d. One operator each either takes components 8a or components 8b from the piles and positions them on a pre-positioning table 33a or 33b.

Both pre-positioning tables 33a and 33b are arranged within a first security area 48a, with the bearing support of the pre-positioning table 33a and/or 33b being withdrawable from this security zone 48a so that the operator can deposit one component 8a and/or 8b each at a predefined position on the deposition area of the pre-positioning table 33a or 33b. The deposition area is then slid into the security area 48a where it is available for further handling.

To join the two components 8a and 8b, two jointing robots 35a and 35b are provided for which by the aid of their grab arms 36*a* and 36*b*, and by way of the suction frames affixed thereto take-off one component 8*a* or 8*b* each from the relevant pre-positioning tables 33*a* or 33*b* and which position them on one of the machining tables 2 or 3 being in charging position in the manner described herein above, using the stop frame 28. Thus, the manually supplied components 8*a* and 8*b* are positioned and fixed on the machining table 2 and 3, respectively.

For this purpose, the grab arm 36*a* and/or 36*b* has a floating joining hand for a compression controlled positioning of the components 8*a* and 8*b*, respectively.

At the end of a machining cycle, in accordance with the functionality of the double-shifting table 100 described herein above, there will be a component 8 welded together from the two components 8*a* and 8*b* which is taken-off of the machining table 2 and/or 3 prior to the next machining cycle and fed forward for further processing.

A possible configuration of a further processing is illustrated in FIGS. 6 and 7 each in the right half. A reclaimer robot 38 takes the finished component 8 from the machining table 3 by means of its grab arm 39 and the suction frame 40 connected therewith. In combination with a reversal robot 41 of a similar configuration, the welded component 8 can be reversed. Subsequently, the component 8 is deposited on a beading vehicle 42. The beading vehicle 42 introduces the component 8 into a beading press, if differently thick components 8*a* and 8*b* have been welded with each other. A multitude of beads will then be engraved into the thinner section of the welded component 8 in order to offset the difference in thickness. Subsequently, the beading vehicle is again reset to its home position and taken-up by the aid of a stacker robot 44. The stacker robot 44 is of the same configuration as those described herein above. Initially, there is the option that the stacker robot 44 deposits the component 8 on an inspection table 45 withdrawable from the security area 48*d* to effect an inspection of the finished component 8. If the inspection and/or a quality control effected during welding in machining device 1 ends up with a negative result, the component 8 is deposited by stacker robot 44 on a wooden pallet 46 and taken-out of the flow of material. In case of a positive quality control, the stacker robot 44 deposits the component 8 on one of two pallets 47*a* or 47*b* which are transported away when the pile height is appropriate.

From FIGS. 6 and 7, it furthermore results that a multitude of security areas 48*a* to 48*e* are provided by the aid of suitable security fences in order to satisfy the security requirements of an automatic material machining facility. However, since the outfit of security areas does not belong to the object of this invention, it is refrained from depicting the allocation of security areas in detail.

From the aforementioned description of the machining course, the directed flow of material results which is marked by the input arrows F on the one hand and the output arrows G in FIG. 6 on the other hand.

Figure 8:
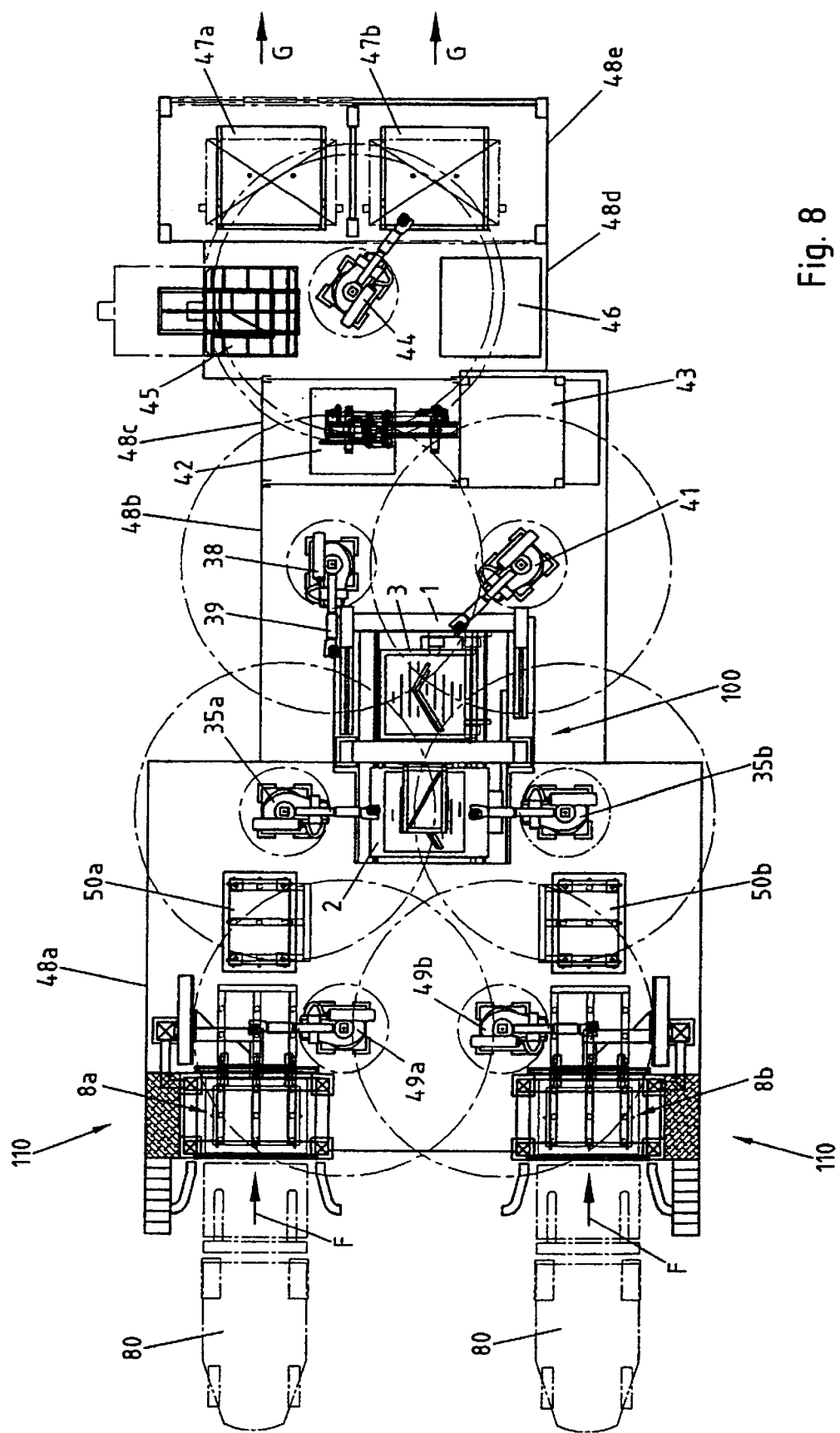
FIG. 8 is a plan view showing a second embodiment of a laser welding equipment with an automatic feed of two components to be welded to each other.

FIG. 8 shows another embodiment of a laser welding equipment, with the same reference symbols designating the same components as described in detail in connection with the embodiment described before.

In contrast with the laser welding equipment described before, the components 8*a* and 8*b* are not supplied manually, but by the aid of fork lift trucks 80 to a device for provision of components which in general are marked with number 10. Later-on, the device 110 will be explained in detail in connection with FIGS. 16 to 21, making reference thereto at this point. In result, two piles of components 8*a* and 8*b* arranged one above the other are provided in each device 110. For automatic take-off of components 8*a* and 8*b*, reclaimer robots 49*a* and 49*b* are provided which reclaim a component 8*a* or 8*b* from an upper or lower pile each and deposit it on the relevant pre-positioning tables 50*a* and 50*b*. Proceeding from the prepositioning tables 50*a* and 50*b*, the components 8*a* and 8*b* are taken-off by the jointing robots 35*a* and 35*b* and supplied to the machining table 2. Subsequently, the machining is effected as described herein above by way of FIG. 6.

FIGS. 9 to 12 show another embodiment of a laser welding equipment, with the same reference symbols designating the same components as described in detail in connection with the embodiments described before.

Figure 9:
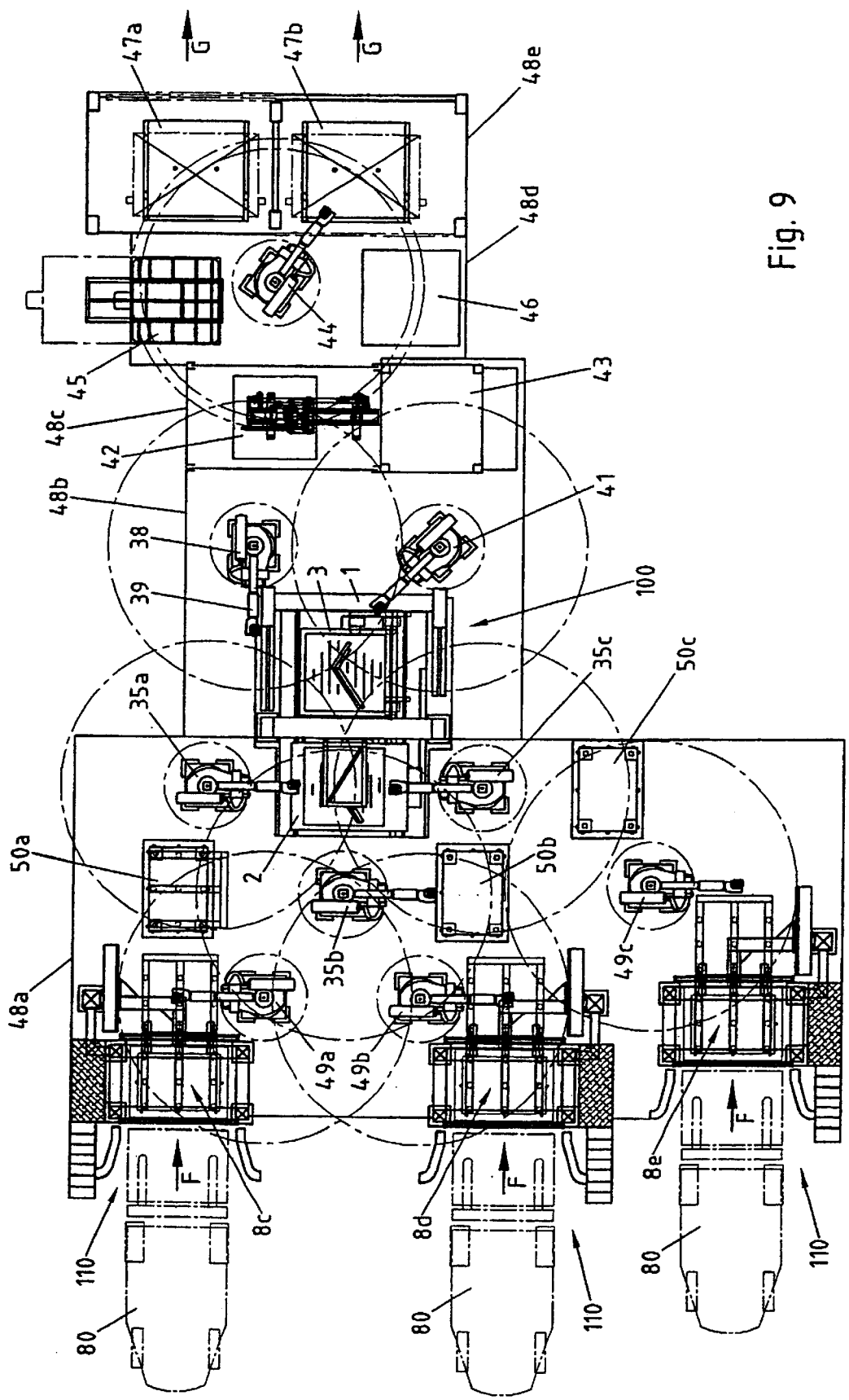
FIG. 9 is a plan view showing a third embodiment of a laser welding equipment with an automatic feed of three components to be welded to each other.
Figure 10:
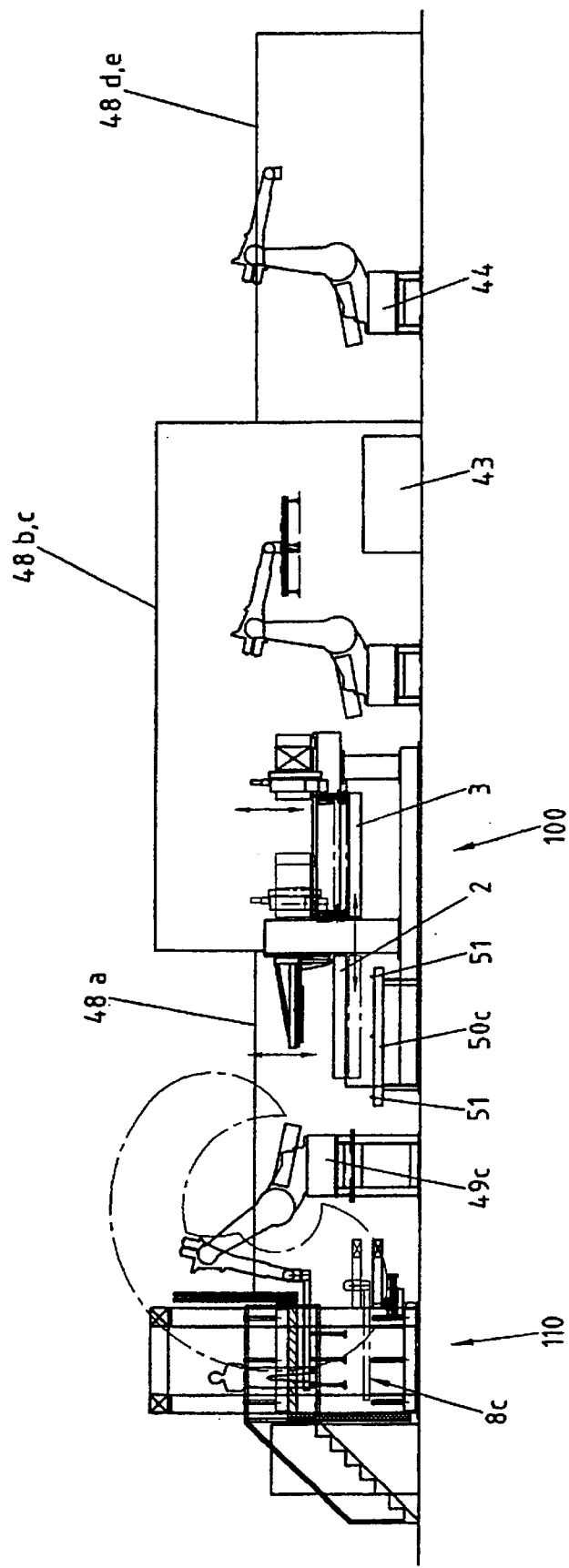
FIG. 10 is a side view of the laser welding equipment illustrated in FIG. 9.
Figure 12:
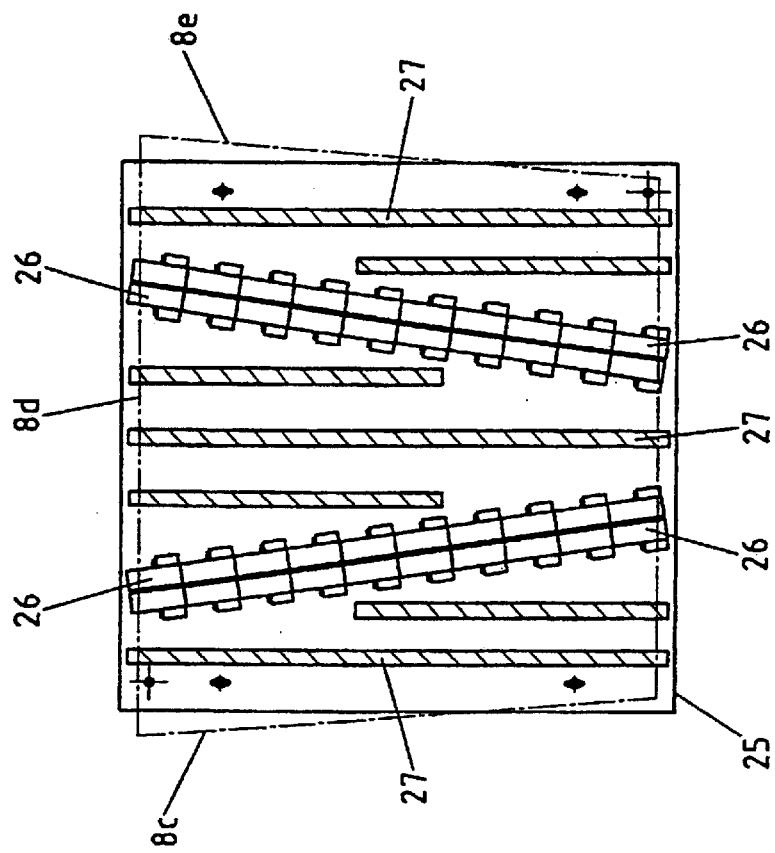
FIG. 12 is a view of a component support for the components illustrated in FIG. 11.
Figure 11:
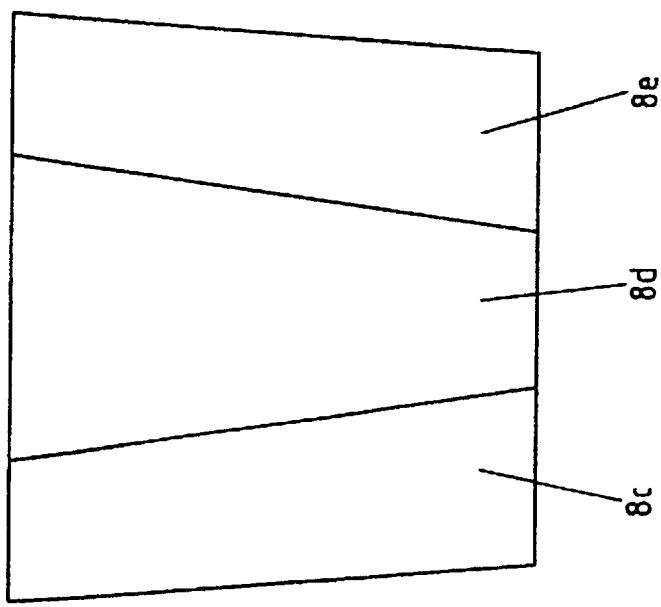
FIG. 11 is a view showing a geometric configuration of the components to be processed in the laser welding equipment illustrated in FIGS. 8 and 9.

The difference of the laser welding equipment of FIGS. 9 and 10 as compared with the preceding embodiments lies in that three components 8*c*, 8*d*, and 8*e* are to be welded together to one component, the shapes of which are depicted in FIG. 11. The pertaining component support 25 is shown on FIG. 12. With the appropriately arranged clamping magnets 26 and the component support ledges 27, it is adapted to the shape of the components 8*c*, 8*d*, and 8*e*. Thus it is required now to supply three different components instead of two components as described herein above to the double-shifting table. This has been solved in the following manner.

In accordance with the material input depicted by arrows F, pallets are supplied by the aid of fork lift trucks 80 to a device 110 for the provision of components. Reclaimer robots 49*a*, 49*b*, and 49*c* are provided for automatic take-off of components 8*c*, 8*d*, or 8*e*. The reclaimer robots 49*a*, 49*b*, and 49*c* reclaim one component 8*c*, 8*d*, or 8*e* from an upper or lower pile each and deposit it onto the relevant pre-positioning tables 50*a*, 50*b*, and/or 50*c*. For precise predefinition of the position of components 8*c*, 8*d*, and 8*e*, centering pins 51 are provided, see FIG. 10. Proceeding from the pre-positioning tables 50*a*, 50*b*, and 50*c*, the components 8*c*, 8*d*, and 8*e* are taken-off by the jointing robots 35*a*, 35*b*, and 35*c* and supplied to the machining table 2 which as per FIG. 9 is arranged in charging position. After a change of machining tables 2 and 3, the three metal sheets 8*c*, 8*d*, and 8*e* are welded together in the machining device 1, whereupon the finished component 8 is post-treated in the manner as described in connection with FIGS. 6 and 7. Here, too, it is valid that a clear-cut flow of material from the left to the right side as per FIGS. 9 and 10 is given which, in turn, is identified by arrows F and G.

Figure 13:
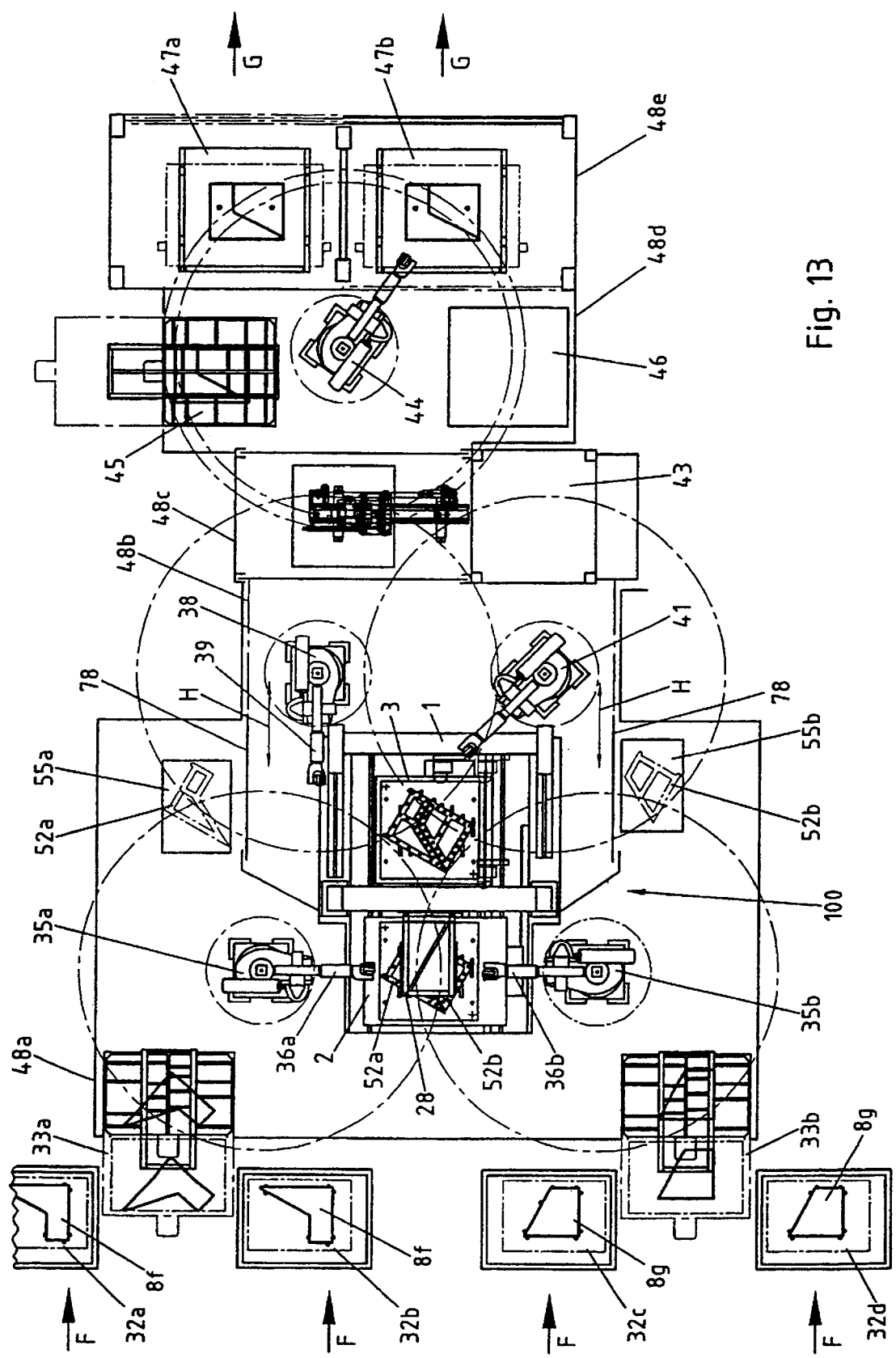
FIG. 13 is a view showing a fourth embodiment of laser welding equipment with a device for machining of components consisting of non-magnetic material.

FIG. 13 depicts another example of an embodiment of the laser welding equipment, the overall set-up of which mainly corresponds with the laser welding equipment with manual supply of components 8*a* and 8*b* as illustrated in FIG. 6. Hence, the same reference symbols correspond with the same construction elements as in the examples of embodiments described herein above.

The difference versus the embodiment as per FIGS. 6 and 7 lies in that a device for machining of components consisting of a non-magnetic material is integrated in the double-shifting table 100. Arranged as fixing elements 26 on the component support 25 of the machining tables 2 and 3 are the clamping magnets. The non-magnetic components 8*f* and 8*g* are arranged by the jointing robots 35*a* and 35*b* on the component support ledges 27 and the fixing elements 26 in the manner described herein above. Clamping elements 52*a* and 52*b* are arranged over the components 8*f* and 8*g*. Thus the clamping elements 52*a* and 52*b* are arranged on those sides of components 8*f* and 8*g* which are averted from the clamping magnets 26. If the clamping magnets 26 are activated, the clamping elements 52a and 52b press the two components 8f and 8g to the component support 25. In this manner, a magnetic fixing of non-magnetic components is realized.

Figure 14:
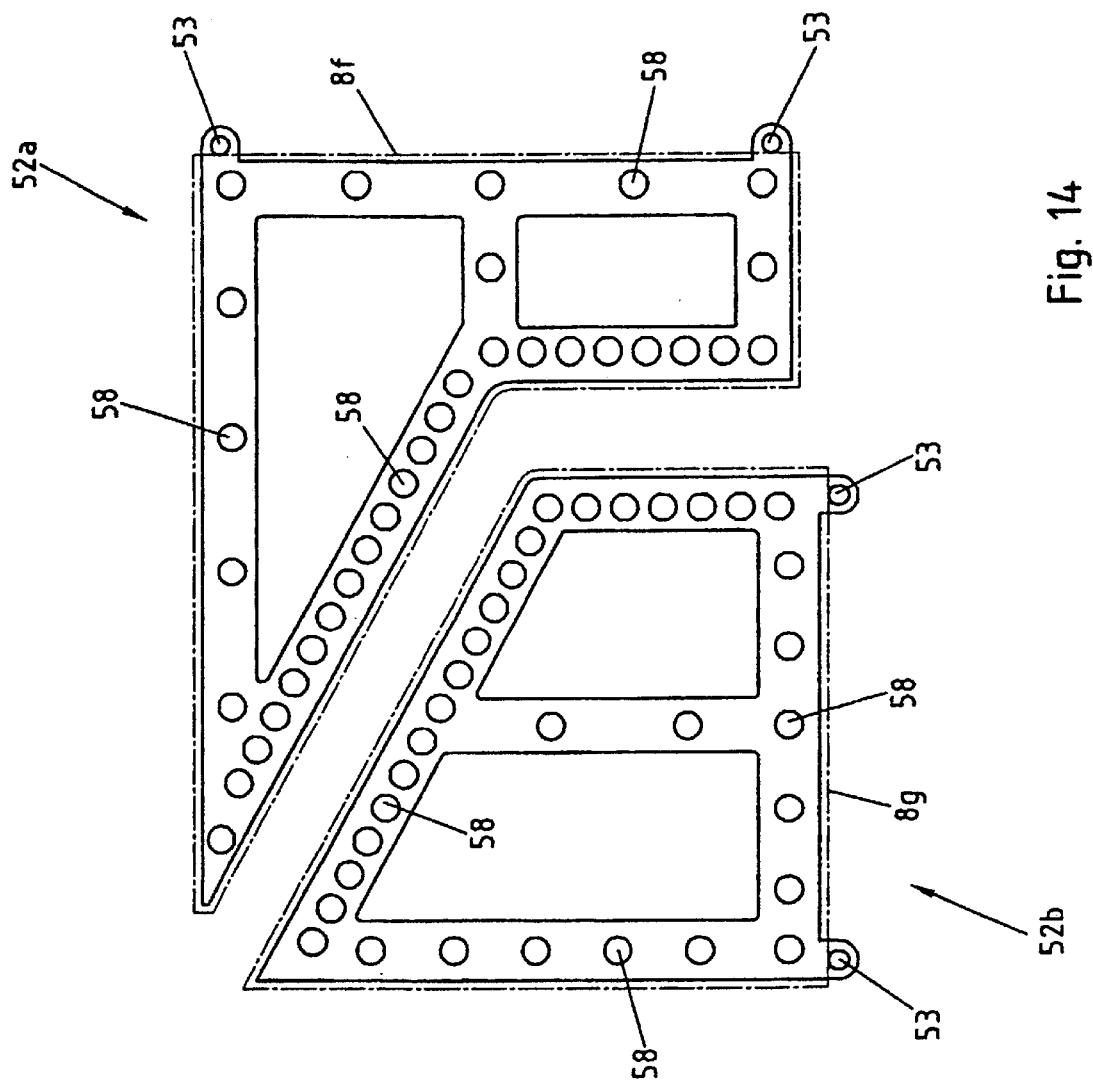
FIG. 14 is a top view showing two component-specific clamping elements.

FIG. 14 shows the two clamping elements 52a and 52b which, for example, have the shape of a frame and are made of a magnetic steel. Shown in dotted lines are the two components 8f and 8g, whereof it results that the clamping elements 52a and 52b each are adapted to the shape of the component 8f and 8g to be affixed. Thus, even with a not exclusively straight course of a weld seam between two components 8f and 8g, it is ensured that the area of the weld seam, in particular, is evenly and reliably fixed on the component support.

Though the clamping elements 52a and 52b are adapted to the outer shape of components 8f and 8g, the clamping elements 52a and 52b expose the relevant components 8f and 8g at least along the area to be machined, i.e., along the weld seam of component 8f and/or 8g. This is realized in that the relevant outer edge of the clamping element 52a and/or 52b is staggered back by a defined distance. Thus, a component-specific clamping element 52a and/or 52b results for each of the separate components 8f and 8g.

As becomes evident from FIG. 14, both clamping elements 52a and 52b have centering holes 3 which co-operate with centering pins 51 arranged at defined positions on the prepositioning table 33a and/or 33b. As the centering holes 53 are in flush alignment with one edge of the component 8f and/or 8g each, the components 8f and 8g can also be aligned by the centering pins 51. Thus, a common centering of clamping elements 52a and 52b with the components 8f and 8g is accomplished.

As shown in FIG. 13, the clamping elements 52 are used for the machining of non-magnetic components 8f and 8g by the aid of a double-shifting table 100. Arranged at both sides of the double-shifting table 100 to serve as a further element for both clamping elements 52a and 52b are the deposition tables 55a and 55b. A machining cycle is accomplished as follows.

For positioning of a component 8f, the jointing robot 35a at first takes the clamping element 52a from the deposition table 55a and transports it to the pre-positioning table 33a. There, the clamping element 52a is lowered onto the component 8f, pre-positioned there and by means of the centering pins, both the clamping element 52a and the component 8a are aligned and centered towards each other. Subsequently, the jointing robot 35a grabs both the clamping element 52a and the component 8a, and transports both to the machining table 2 which is arranged in the charging position. There, by means of the floating jointing hand of the jointing robot 35a, the component 8a is aligned together with the clamping element 52a at the stop frame and positioned on the component support 25.

The clamping element 52b and the non-magnetic component 8b are positioned on the machining table 2 in the same manner.

After machining of the two non-magnetic components 8a and 8b in the machining direction 1, prior to taking-off the machined component 8, the clamping elements 52a and 52b are at first taken-off by the reclaimer robot 38 and reversal robot 41 from the machining table and deposited on the relevant deposition tables 55a and 55b. To this effect, the security area 48b is opened briefly by a sliding gate 78 versus the security area 48a as depicted by the double arrow. The clamping elements 52a and 52b thus are available for a new machining cycle. Hereof, it results a guidance of the clamping elements 52a and 52b in a circulation so that a mobile guidance of the clamping elements 52a and 52b is realized which satisfies the needs of a directed flow of material during the use of the double-shifting table 100.

Figure 15:
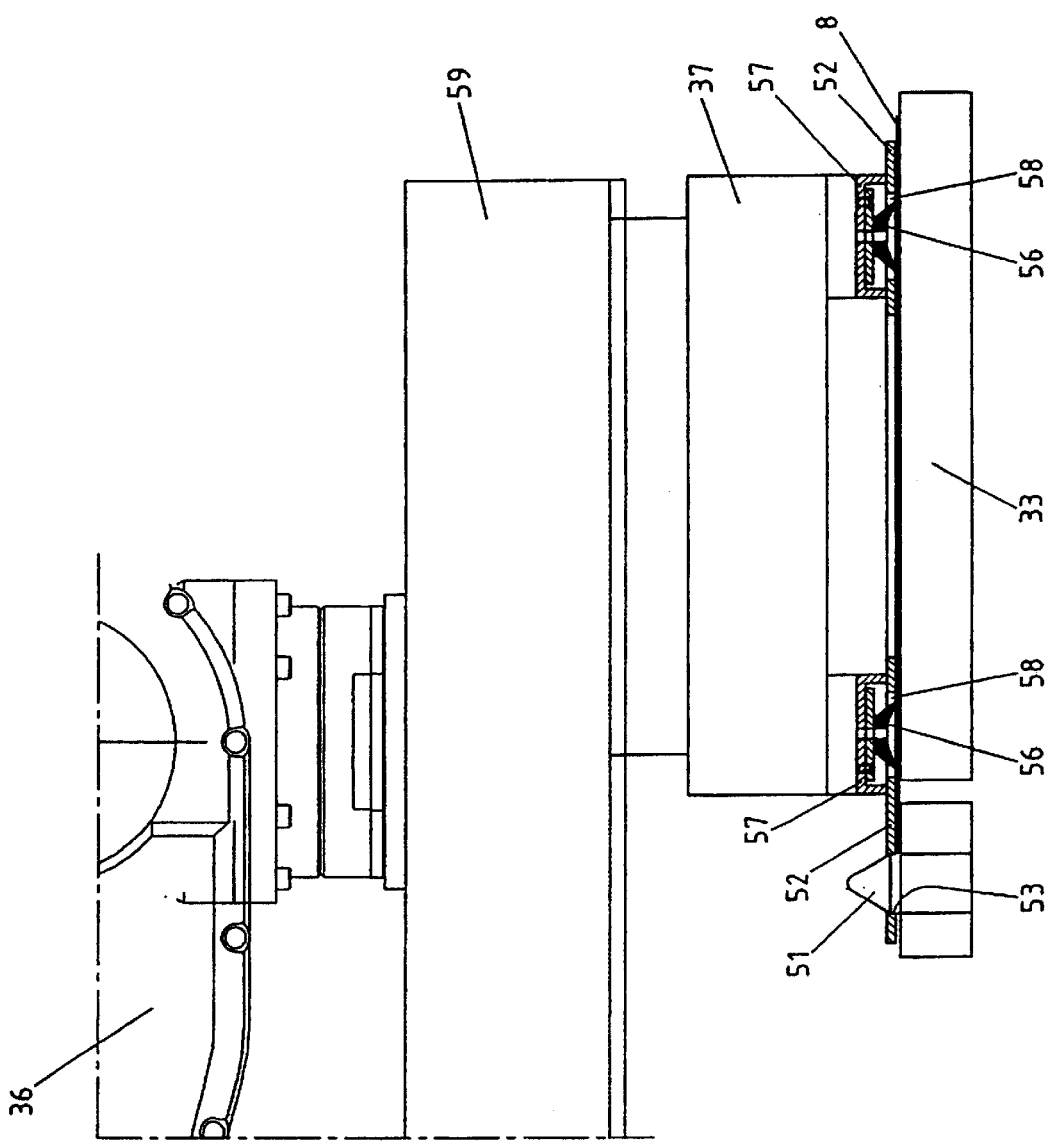
FIG. 15 is a side view showing a device for grabbing of two separate objects, partly intersected.
Figure 16:
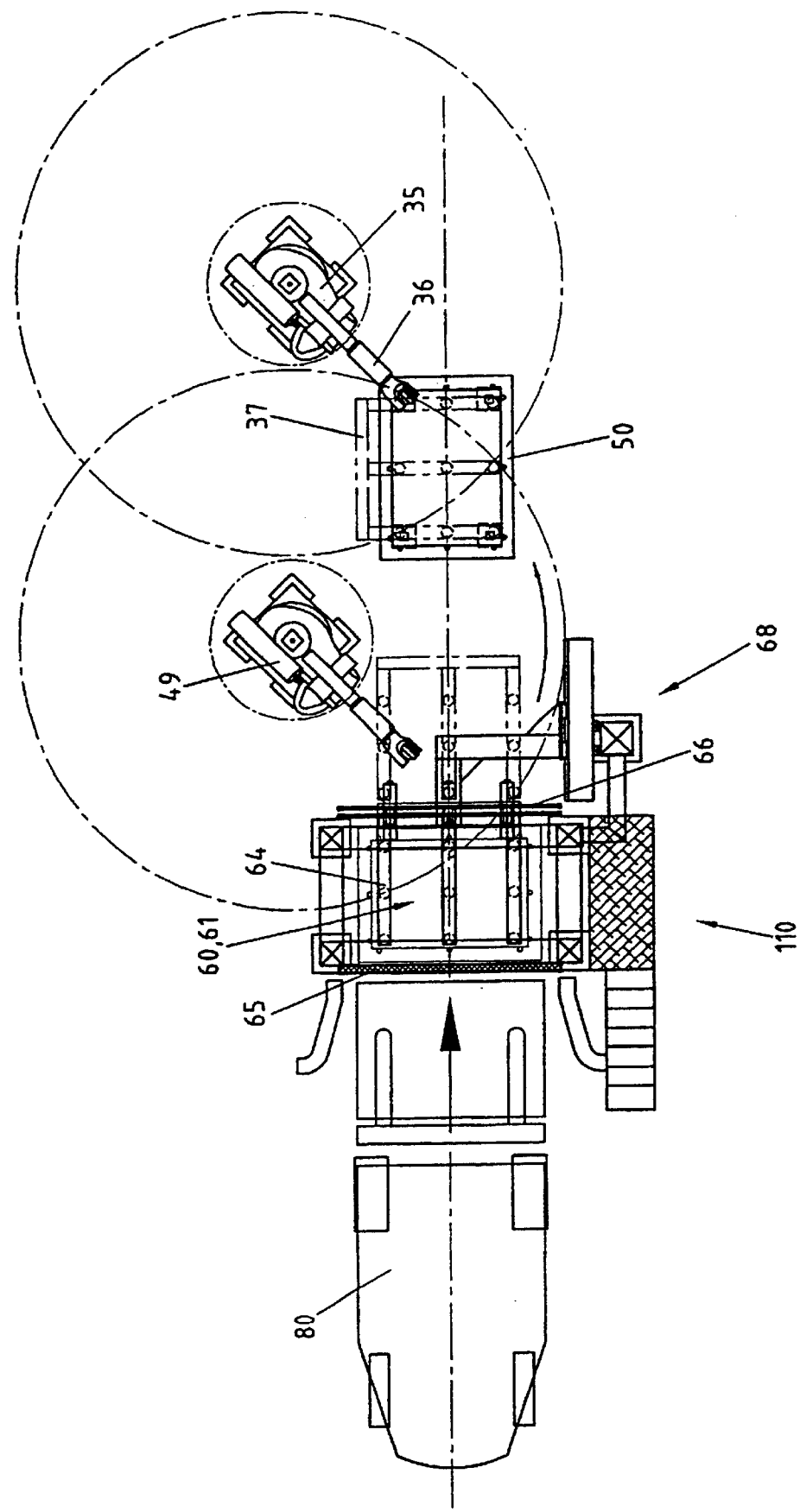
FIG. 16 is a top view showing a device for provision of components in a top view.
Figure 17:
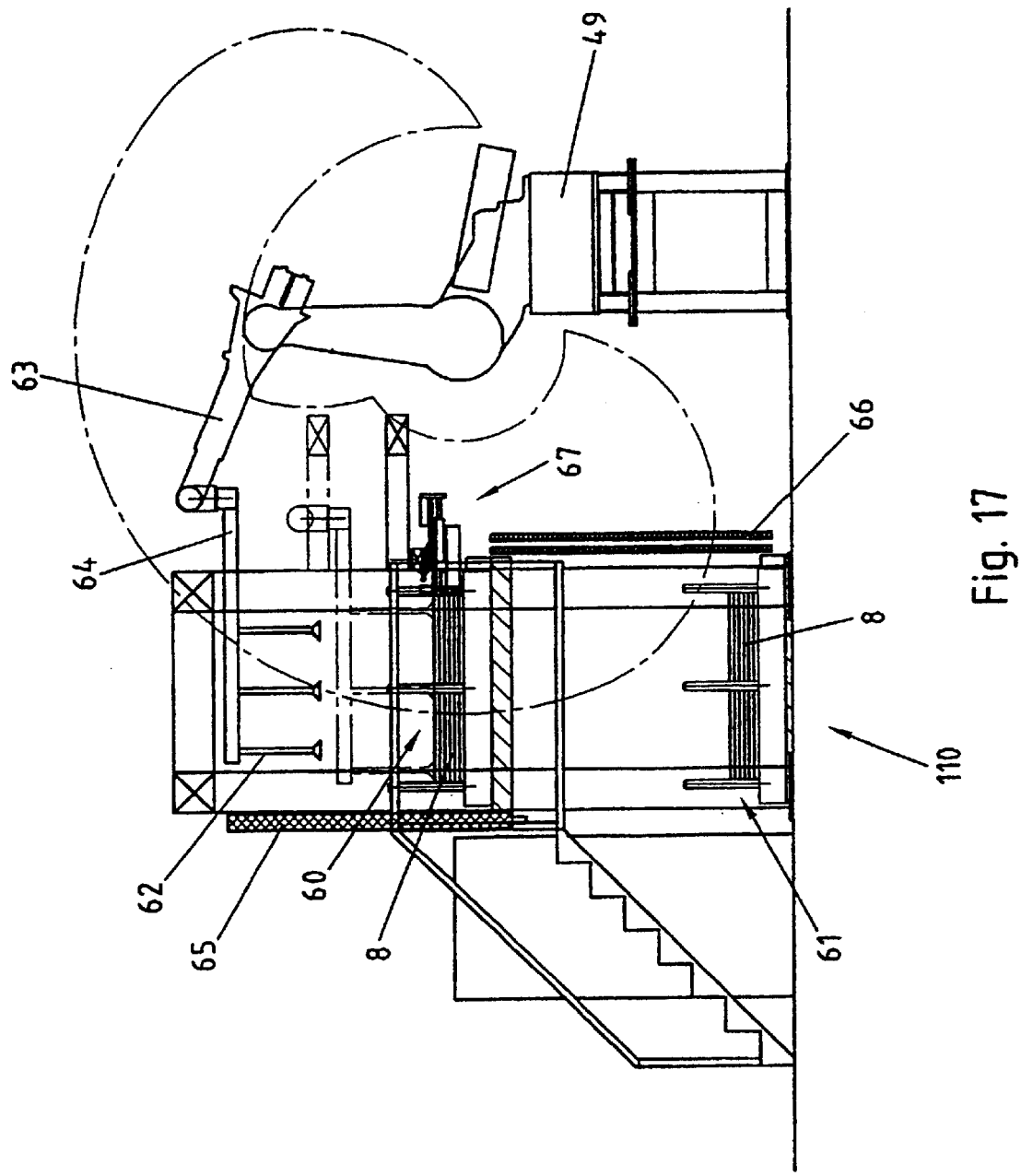
FIG. 17 is a side view showing the device illustrated in FIG. 16 in a first working position.
Figure 18:
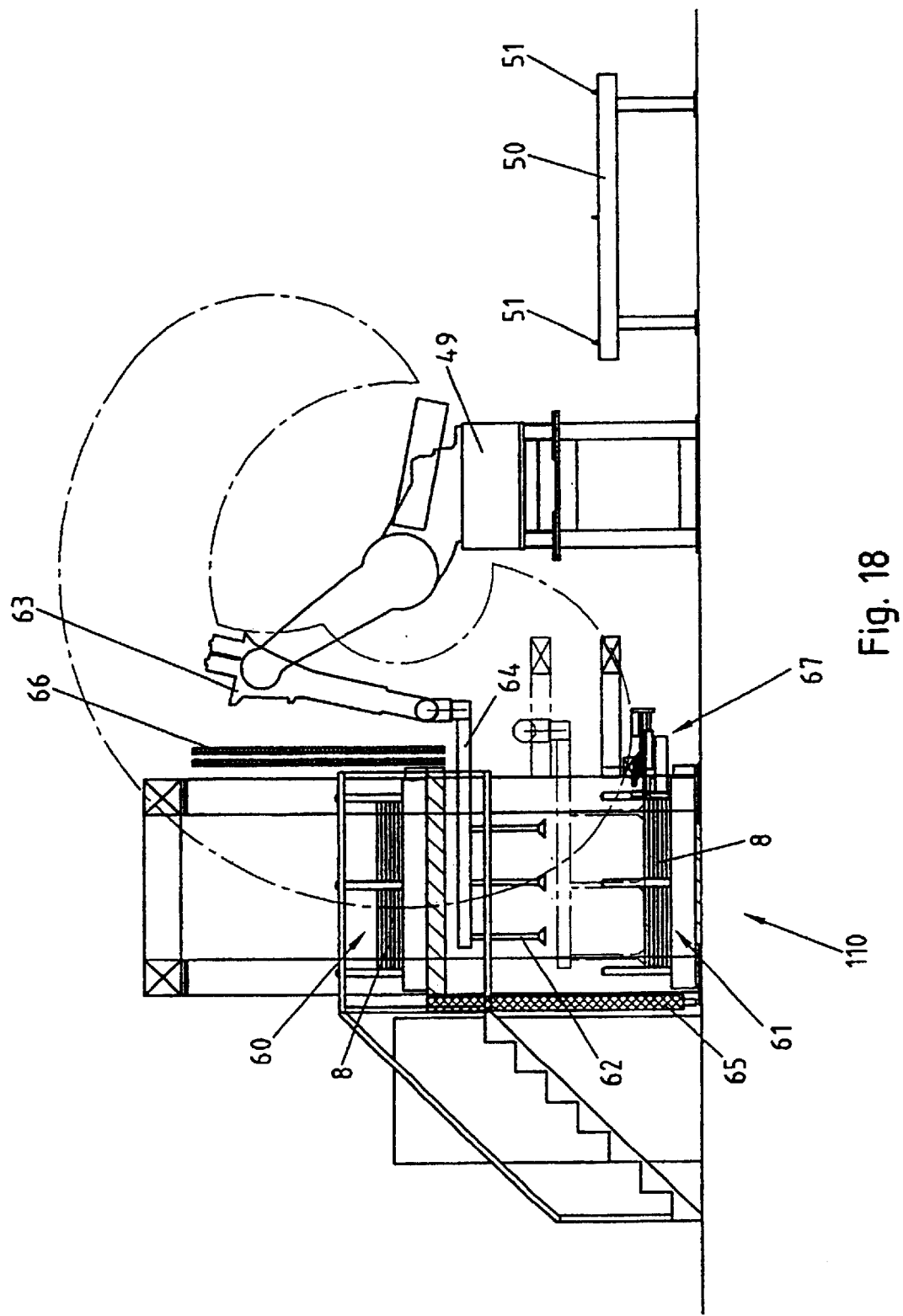
FIG. 18 is a side view showing the device illustrated in FIG. 16 in a second working position.

As shown on FIG. 15, the two jointing robots 35a and 35b are specifically configured to grab both the clamping element 52 and the relevant component 8 and to supply them to the machining table 2 and 3, respectively. To this effect, the jointing robots 35 each have a device for grabbing of two separate objects with a grab arm 36, a suction frame 37 affixed to grab arm 36, and a multitude of suction elements 56 which are connected to the suction frame 37. Moreover, a magnetic grabbing device 57 is provided by the aid of which the clamping element 52 made of magnetic steel can be grabbed. For example, this is accomplished on the deposition table 55. As illustrated on FIG. 13 and, particularly, on FIG. 14, the frame of the clamping element 52 has a multitude of openings 58. As shown on FIG. 15, to grab the non magnetic component 8, the suction elements 56 extend through the openings 58 in clamping element 52 to rest at component 8. Thus, the device can grab the non-magnetic clamping element 52 as well as the non-magnetic component 8 and feed them together to a machining table, for example to machining table 2 and/or 3 of the double-shifting table 100.

As becomes evident from FIGS. 14 and 15, both the magnetic grabbing device 57 and the suction frame 37 are component-specifically configured with the suction elements 56, i.e. they are adapted to the outer shape of the clamping elements 52 and components 8 which are to be grabbed.

Moreover, on FIG. 15, one can see the use of the centering pin 51, around which the centering hole 53 of the clamping element 52 extends. Thus, the clamping element 52 is centered relative to the pre-positioned component 8 so that a centering towards each other is also accomplished during the jointing of both parts.

As furthermore shown on FIG. 15, the suction frame 37 is affixed to a floating jointing hand which is known from prior art technology and by way of which it is possible to effect a precise positioning of components 8 on machining table 2 and 3, respectively, without this causing too great a bearing force that might damage the component edge.

On FIGS. 8 to 10 which have already been described herein above, devices 110 for provision of components have been mentioned. In the following, a detailed outline of the device 110 will be given on the basis of FIGS. 16 to 21.

The device 110 for provision of components has a first take-up area 60 to take-up a first pile of components 8 as well as a second take-up area 61 to accommodate a second pile of components 8. Moreover, a reclaimer device in the form of a reclaimer robot 49 is provided which reclaims components 8 optionally from the first pile or from the second pile. As becomes evident particularly from FIGS. 17 and 18, the take-up areas 60 and 61 are arranged one above each other so that the required ground area for both piles of components 8 is required only once. Therefore, two piles of components 8 can be provided at minimum space requirements, as becomes evident from the top view of FIG. 16, in particular.

The jointing robot 49 has a grab arm 63, which a suction frame 64 is affixed to.

Connected to the suction frame 64 is a multitude of suction elements 62 to grab components 8. By way of an appropriate approach to the reclaimer robot 49, components 8 are optionally taken either from the upper pile in the first take-up area 60, see FIG. 17, or from the lower pile in the second take-up area 61, see FIG. 18. Shown on the two FIGS. 17 and 18 each is the lowered position of the suction elements 62. If all components 8 of a pile are reclaimed by reclaimer robot 49, the take-off of components 8 from the lower second pile can then be continued without any time delay, with it being possible to bring a new pile of components 8 with a fork lift truck 80 into the first take-up area 60. Subsequently, if the second pile of components 8 in the second take-up area 61 has been exhausted, the take-off of components 8 can again be accomplished in the first take-up area 60, while a new pile of components 8 is arranged in the second take-up area.

Thus, it results a tower-like set-up of the device 110 for provision of components which covers a minimum ground area. Consequently, the expenditure on shielding the take-up areas 60 and 61 is smaller than the one required by prior art technology so that the production costs of device 110, in particular, can be reduced. The production costs are also reduced substantially because there is no need for adjustment devices for the pallets to effect adjustments between a charging position and a reclaiming position.

Lifting gates 65 and 66 are provided to serve as security devices, with the lifting gate 65 blocking access to the relevant active take-up area 60 and/or 61, while the lifting gate 66 prevents intervention of the reclaimer robot 49 into the relevant passive take-up area 60 and/or 61. This becomes evident by a comparison of FIGS. 17 and 18.

To ensure safe and secure reclaiming of components 8, a singularization device 67 is provided which is moved by a lifting device 68 within both take-up areas 60 and 61. Thus, the singularization device can be moved each into the active take-up area 60 and/or 61 from where the reclaimer robot 49 is taking-off the components 8 at a given moment. Hence, it is again possible to economize on costs, because only one singularization device is required for each device 110 for provision of components 8.

Figure 20:
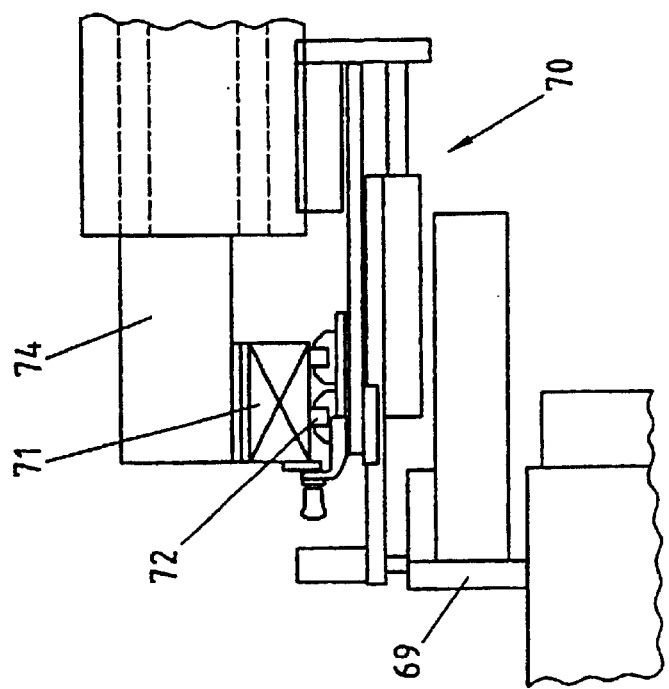
FIG. 20 is a view showing a partial extract from FIG. 19.
Figure 19:
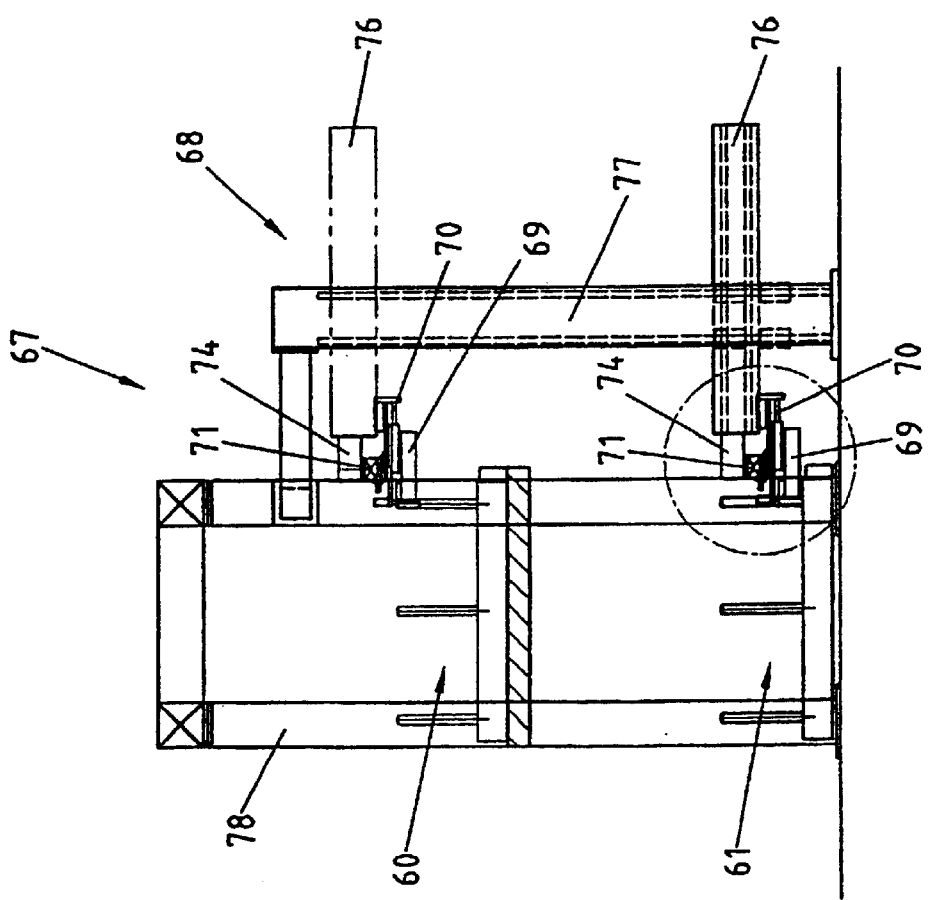
FIG. 19 is a side view showing a singularization device for singularization of components lying one above the other in a device illustrated in FIGS. 16 to 18 for provision of components.
Figure 21:
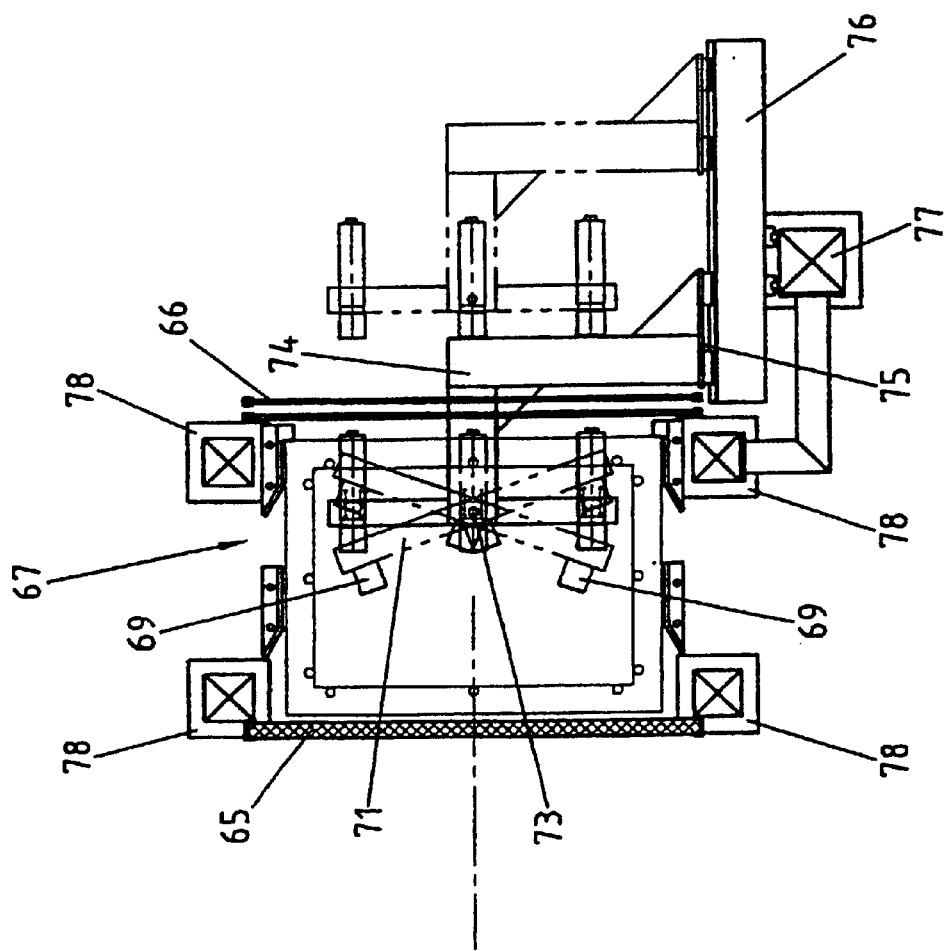
FIG. 21 is a top view showing the singularization device illustrated in FIG. 19.
Figure 23:
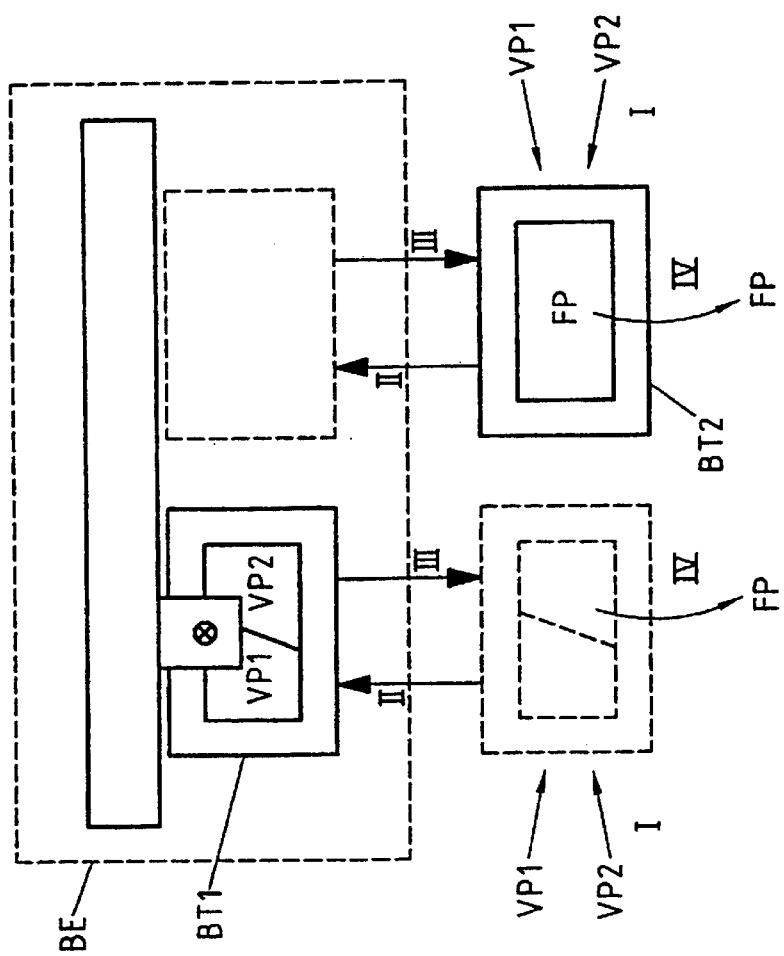
FIGS. 22–26 show the prior art devices for machining and provision of components.
Figure 22:
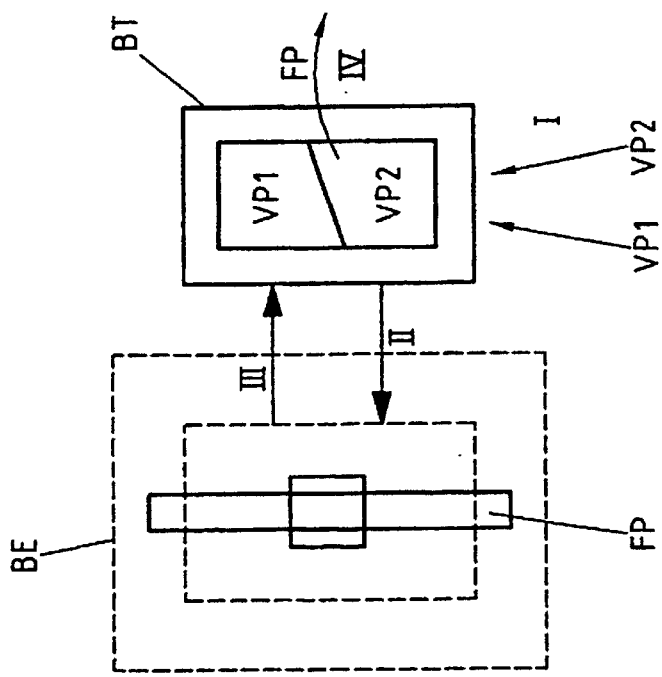
Figure 24:
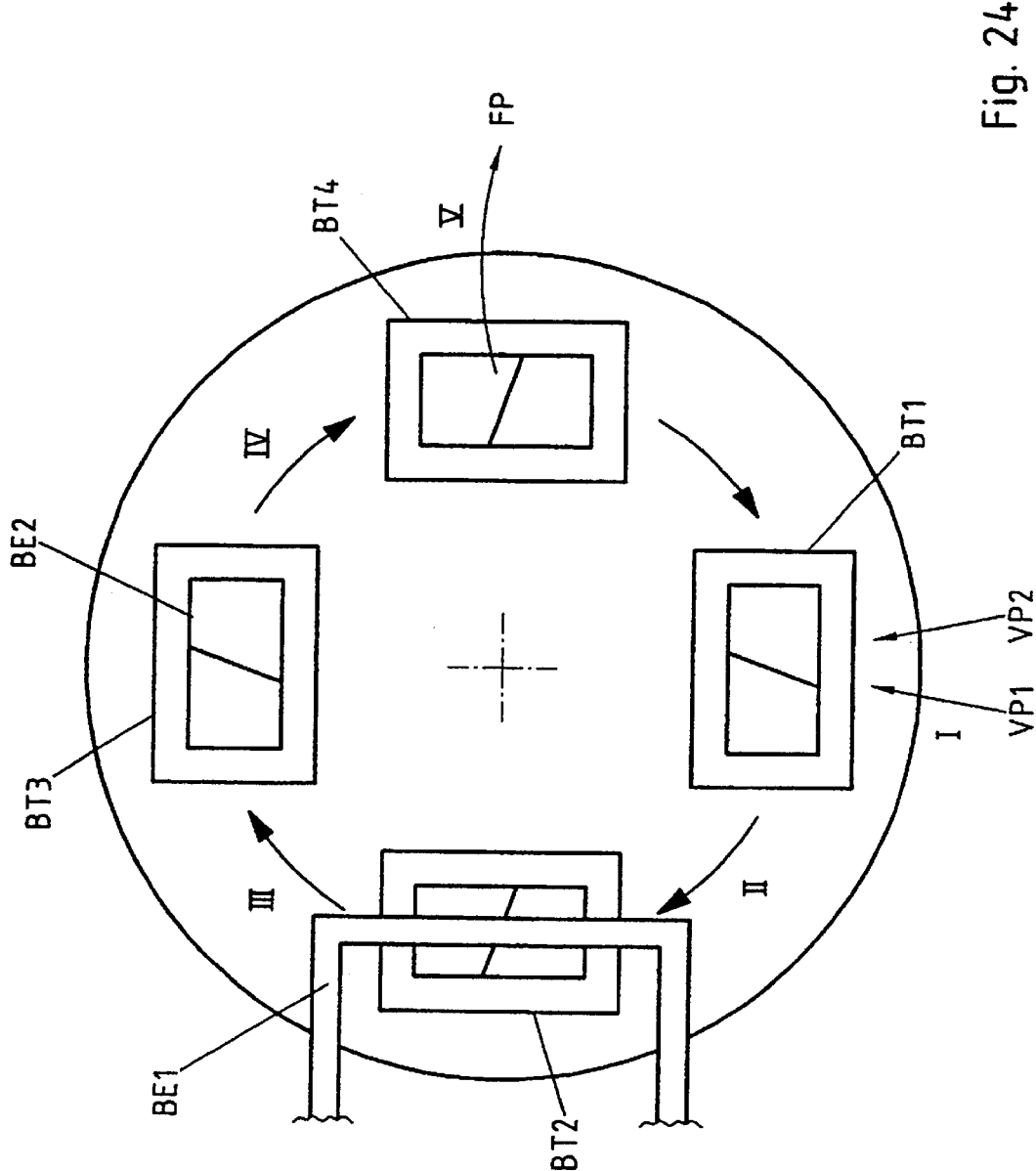
Figure 26:
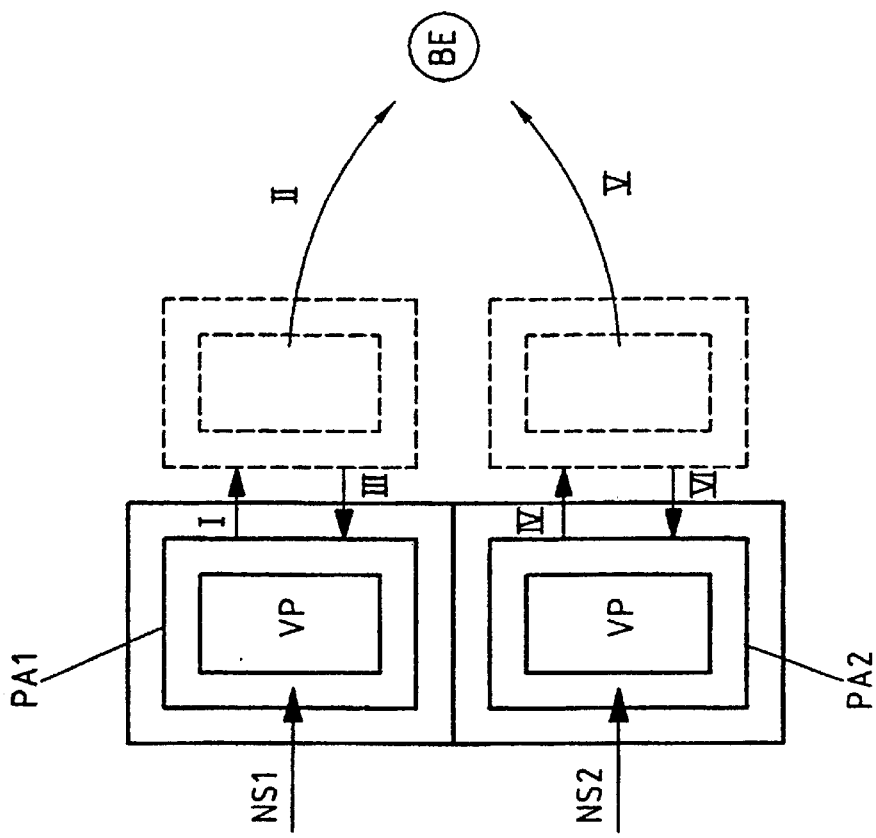
Figure 25:
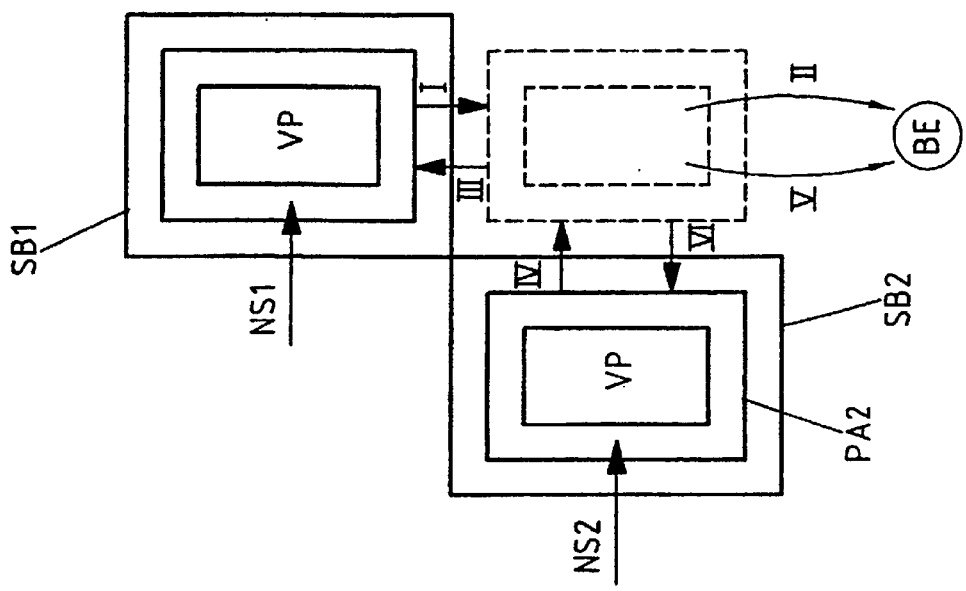

Shown on FIGS. 19 to 21 are the details of the singularization device 67 as well as of the lifting device 68. According to FIG. 20, the lifting device has a singularization magnet 69 which can be moved horizontally along a mechanical guide 70. The mechanical guide 70, in turn, is movably arranged along a magnetic beam 71, which a mechanical guide 72 is provided for. Thus, the position of each singularization magnet 69 along the magnetic beam 71 can be adjusted individually and adapted to the shape of a component 8 that is to be singularized. The magnetic beam 71 is affixed to a lifting arm 74 in a swivelling arrangement around axis 73, said lifting arm 74 being affixed to an x-carriage. The x-carriage is affixed in linearly adjustable arrangement to a z-carriage which is affixed in vertically adjustable arrangement to a rack 77. Thus, the lifting device 68 can adjust the singularization magnets 69 to optional positions within the take-up areas 60 and 61. The rack 77, in turn, is linked to the frame 78 of the device 110.

To elucidate the movement of the singularization magnet 69 as well as of the lifting device 68, various positions are represented in dotted lines. The same applies to FIG. 19 which shows two different lifting positions of the lifting device 68 in straight and dotted lines.

While specific embodiments of the invention have been shown and described in detail to illustrate the application of the principles of the invention, it will be understood that the invention may be embodied otherwise without departing from such principles.

What is claimed is:

1. A method for machining of at least one non-magnetic material component, the method comprising:
    positioning the component on at least one clamping magnet arranged on a machining table;
    arranging at least one magnetic material clamping element on a side of the component which is averted from the clamping magnet;
    activating the clamping magnets whereby the component is fixed in its position by the aid of the clamping element; and
    adapting the clamping element to the shape of the component.

2. A method pursuant to claim 1, wherein at least two components are positioned and fixed on the machining table and the clamping elements allocated to the components expose an area of a pre-defined width along at least one contact line of the components and the at least two components are welded to each other along at least one contact line.

3. A method pursuant to claim 1, wherein one component is positioned and fixed on the machining table and whereby at least two clamping elements are allocated to the component, with the clamping elements exposing an area of a pre-defined width along at least one machining line and in which the component is cut-apart along at least one line.

4. A method pursuant to claim 1, wherein after machining of-at least one component, at least one clamping element is initially taken-off from the machining table, whereby at least one clamping element is positioned on at least one deposition table and in which at least one machined component is taken-off from the machining table.

5. A method pursuant to claim 4, wherein the clamping element deposited on the deposition table is taken-off for a new charging procedure and positioned onto at least one component on the machining table arranged in the charging position.

6. A method pursuant to claim 1, wherein initially, by the aid of a grab arm, the clamping element is grabbed by means of a grabbing device, then the component is grabbed by the aid of suction elements and the clamping element and the component are positioned jointly on the machining table.

7. A method pursuant to claim 1, wherein:
    a) the machining table is arranged in a charging position and a second machining table is arranged in a machining position within a working area of a machining device;
    b) at least one component is positioned and fixed on the machining table;
    c) the first machining table is shifted into a machining position and the second machining table is shifted into a charging position by the aid of an adjustment means;
    d) at least one component is machined in the machining device;
    e) after machining, at least one component is taken-off from the machining table;
    f) during the steps (d) and (e), at least one component is arranged and fixed on the second machining table;
    g) whereby the steps (c) to (f) are alternately executed for both machining tables; and wherein
    the machining tables are arranged at different planes one above each other; and
    the machining tables are shifted linearly between the charging position and the machining position.

8. A method pursuant to claim 7, wherein at least two components are arranged on a machining table and connected to each other by the aid of a machining device.

9. A method pursuant to claim 7, wherein at least one component is cut apart by the machining device into at least two parts.

10. A method pursuant to claim 7, wherein a vertical position of an end effector of the machining device is adapted to match a vertical position of the relevant machining table in the working area of the machining device.

11. A method pursuant to claim 7, wherein at least one component is adjusted on the machining table by the aid of a stop frame.

12. A method pursuant to claim 11, wherein a vertical position of the stop frame is adapted to match a vertical position of the machining table in the charging position.

13. A method pursuant to claim 7, wherein at least one component is positioned by the aid of a jointing robot on the machining table arranged in the charging position.

14. A method pursuant to claim 7, whereby at least one component is taken-off by the aid of a reclaimer robot from the machining table arranged in the machining position.

15. A method pursuant to claim 13, whereby a vertical position of a grab element of a jointing robot and/or of a reclaimer robot is adapted to match a vertical position of the machining table arranged in the charging position and/or the machining position.

16. A method pursuant to claim 1, wherein:
a first pile of components is arranged in a first take-up area;
a second pile of components is arranged in a second take-up area;
the components are either reclaimed by means of a reclaimer device from the first pile or from the second pile; and
the first take-up area and the second take-up area are arranged at least partly one above each other.

17. A method pursuant to claim 16, wherein the first take-up area and the second take-up area are arranged completely one above each other.

18. A method pursuant to claim 16, wherein the components lying one above each other are singularized by a singularization device and in which the singularization device is moved by a lifting device at least within vertical sections corresponding to two take-up areas.

19. A method pursuant to claim 16, wherein the components lying one above each other are singularized by the aid of at least one plate spreading magnet.

* * * * *